United States Patent
Yokota et al.

[11] Patent Number: 5,926,448
[45] Date of Patent: Jul. 20, 1999

[54] RECORDING MEDIUM, RECORDING APPARATUS, REPRODUCING METHOD, AND REPRODUCING APPARATUS

[75] Inventors: Teppei Yokota, Chiba; Ayataka Nishio, Kanagawa, both of Japan

[73] Assignee: Sony Corporation, Tokyo, Japan

[21] Appl. No.: 08/999,557

[22] Filed: Nov. 4, 1997

Related U.S. Application Data

[62] Division of application No. 08/765,828, filed as application No. PCT/JP96/01489, May 31, 1996.

[30] Foreign Application Priority Data

May 31, 1995 [JP] Japan .................................. 7-156759

[51] Int. Cl.$^6$ ....................................................... G11B 7/00
[52] U.S. Cl. .............................. 369/47; 369/54; 369/58; 369/32
[58] Field of Search .................................. 369/275.3, 54, 369/58, 47, 60, 32

[56] References Cited

U.S. PATENT DOCUMENTS

| | | | |
|---|---|---|---|
| 5,206,850 | 4/1993 | Tezuka et al. | 369/48 |
| 5,295,433 | 3/1994 | Okano et al. | 369/48 |
| 5,392,264 | 2/1995 | Hira | 369/32 |
| 5,488,593 | 1/1996 | Furumiya et al. | 369/32 |
| 5,491,561 | 2/1996 | Fukuda | 358/342 |
| 5,493,548 | 2/1996 | Kamioka | 369/48 |
| 5,563,855 | 10/1996 | Nakase et al. | 369/32 |
| 5,648,948 | 7/1997 | Itoh et al. | 369/48 |
| 5,648,954 | 7/1997 | Satoh | 369/275.1 |
| 5,656,348 | 8/1997 | Kudo et al. | 428/641 |
| 5,684,786 | 11/1997 | Schylander et al. | 369/275.3 |
| 5,687,397 | 11/1997 | Ohmori | 395/893 |

FOREIGN PATENT DOCUMENTS

| | | |
|---|---|---|
| 62-78744 | 4/1987 | Japan . |
| 2-116061 | 4/1990 | Japan . |
| 2-98874 | 4/1990 | Japan . |
| 2-193317 | 7/1990 | Japan . |
| 5-8714 | 2/1993 | Japan . |
| 5-250811 | 9/1993 | Japan . |
| 6-44692 | 2/1994 | Japan . |

*Primary Examiner*—Nabil Hindi
*Attorney, Agent, or Firm*—Limbach & Limbach L.L.P.

[57] ABSTRACT

A recording medium to which this invention is applied includes a first recording area 3 where a digital audio signal sampled at a predetermined sampling frequency and quantized by a predetermined number of bits is recorded, a first management area 2 where information for carrying out management of the digital audio signal recorded in the first recording area 3 is recorded, a second recording area 6 where a digital audio signal corresponding to the digital audio signal recorded in the first recording area 3 is recorded, and a second management area 5 where information for carrying out management of the digital audio signal recorded in the second recording area 6 is recorded, wherein discrimination data indicating that plural recording areas exist is recorded in the first management area 2.

Thus, this recording medium has compatibility with the conventional CD player, and can be reproduced in the state of high sound quality by a higher rank reproducing equipment.

13 Claims, 19 Drawing Sheets

| TRACK NO. PORTION | INDEX PORTION | ELAPSED TIME PORTION | | | O PORTION | ABSOLUTE TIME PORTION | | |
|---|---|---|---|---|---|---|---|---|
| | | MIN. COMPONENT PORTION | SEC. COMPONENT PORTION | FRAME NO. COMPONENT PORTION | | MIN. COMPONENT PORTION | SEC. COMPONENT PORTION | FRAME NO. COMPONENT PORTION |
| TNO | IX | MIN | SEC | FR | | P MIN | P SEC | P FR |
| 101 | 102 | 103 | 104 | 105 | 106 | 107 | 108 | 109 |

110 — ELAPSED TIME PORTION
111 — ABSOLUTE TIME PORTION
120

FIG.4

| TRACK NO. PORTION | POINT PORTION | ELAPSED TIME PORTION | | | O PORTION | ABSOLUTE TIME PORTION | | |
|---|---|---|---|---|---|---|---|---|
| | | MIN. COMPONENT PORTION | SEC. COMPONENT PORTION | FRAME NO. COMPONENT PORTION | | MIN. COMPONENT PORTION | SEC. COMPONENT PORTION | FRAME NO. COMPONENT PORTION |
| TNO | PO | MIN | SEC | FR | | P MIN | P SEC | P FR |
| 101 | 112 | 103 | 104 | 105 | 106 | 107 | 108 | 109 |

FIG. 11A
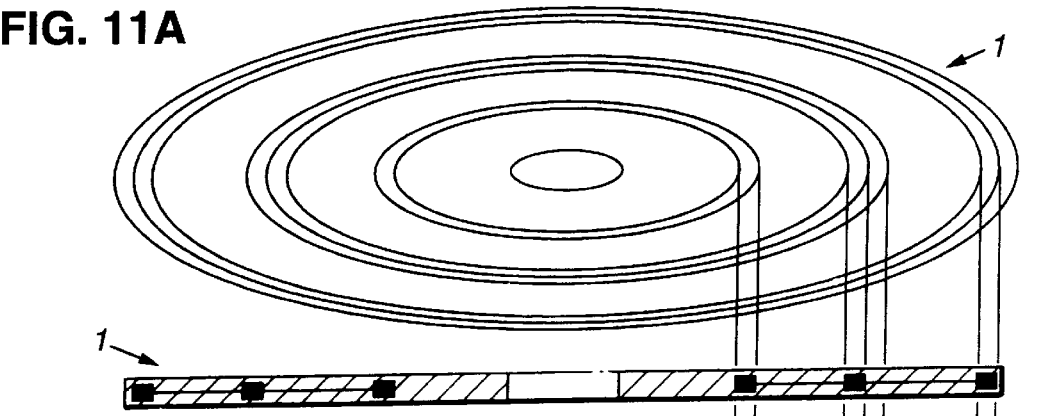
FIG. 11B
FIG. 11C
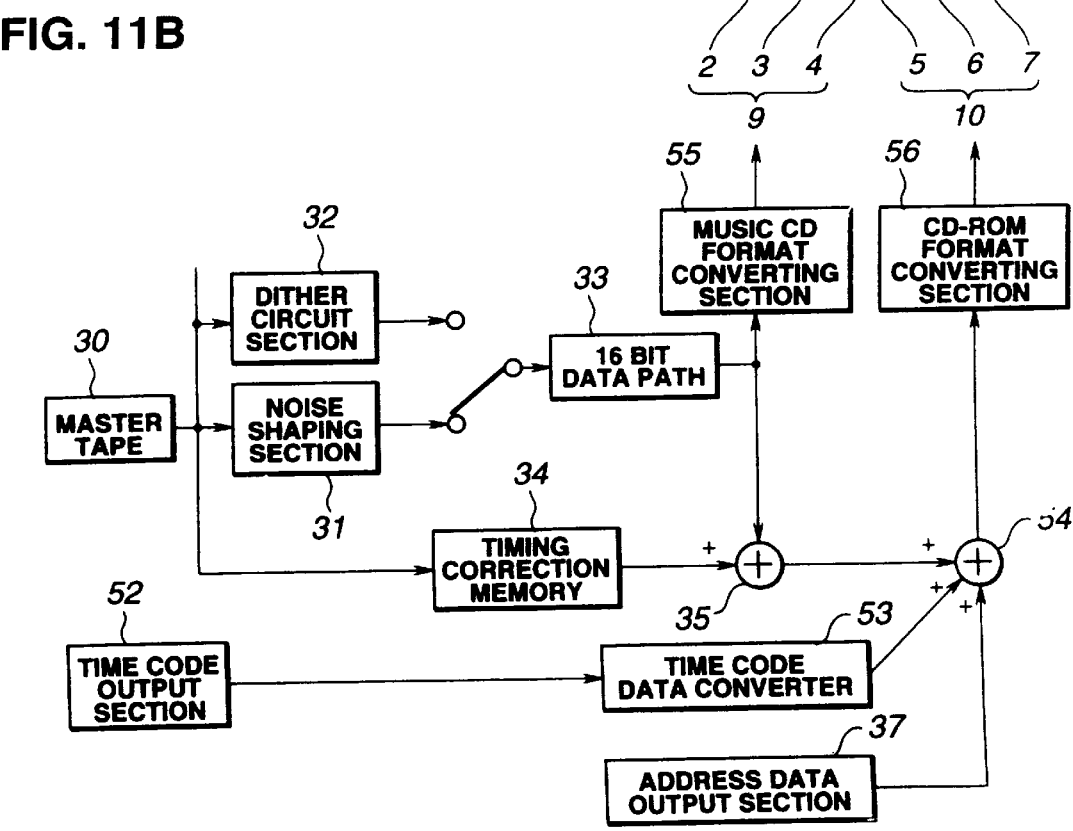

FIG. 20A
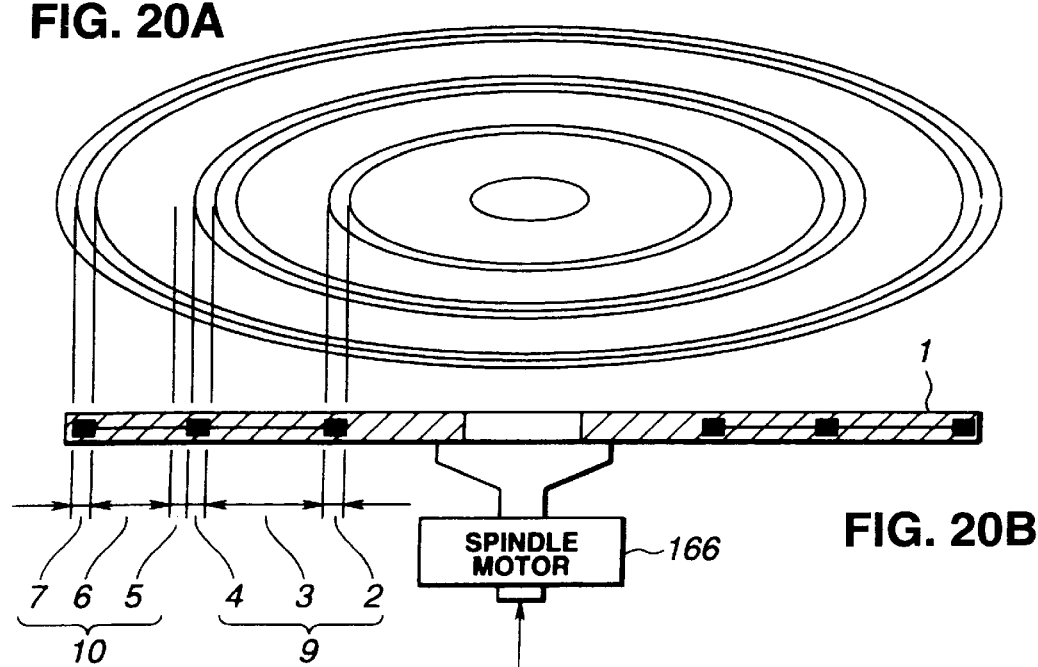
FIG. 20B
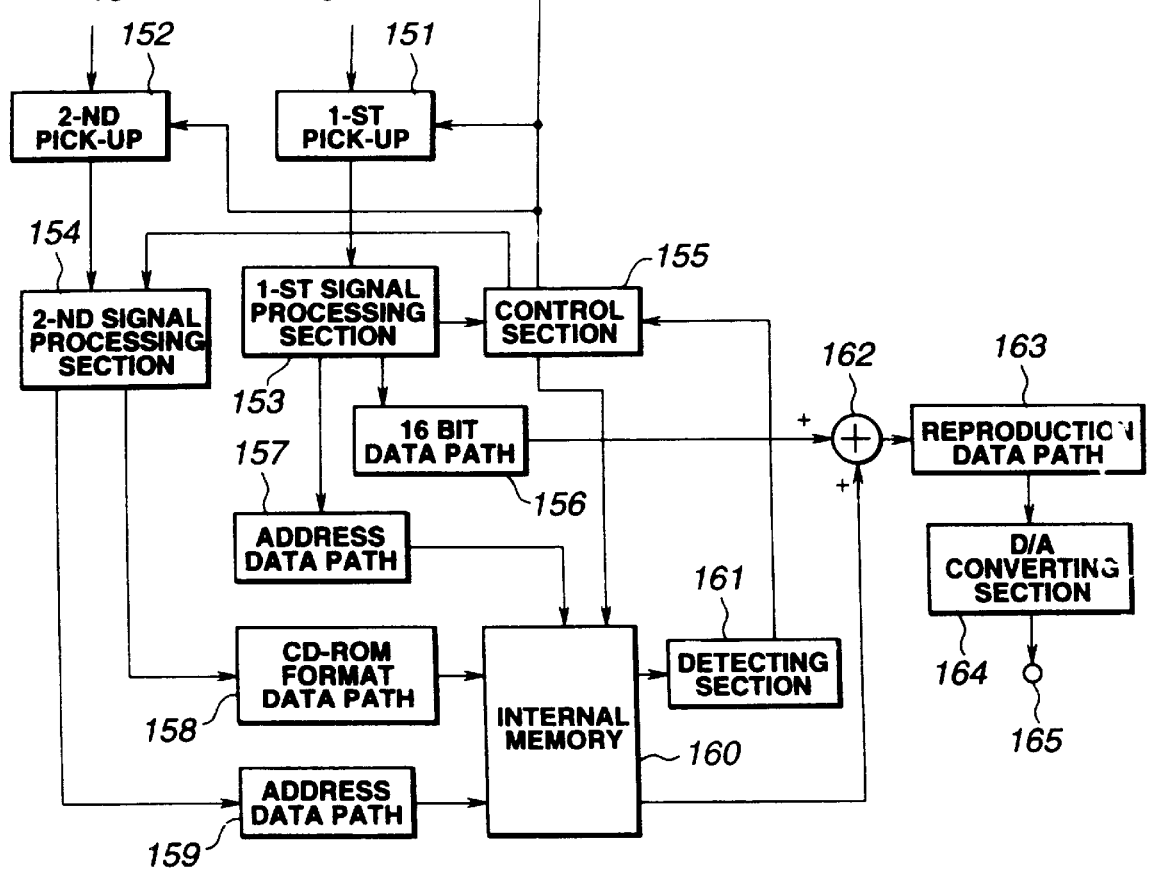
FIG. 20C

RECORDING MEDIUM, RECORDING APPARATUS, REPRODUCING METHOD, AND REPRODUCING APPARATUS

This is a divisional of application No. 08/765,828, filed Jan. 22, 1997, which is a §371 application of PCT/JP96/01489, filed May 31, 1996.

TECHNICAL FIELD

This invention relates to a recording medium including plural recording areas, a recording apparatus for recording information on such a recording medium, a reproducing method for reproducing information recorded on such a recording medium, and a reproducing apparatus to which such a reproducing method is applied.

BACKGROUND ART

Compact Discs (CDs) are delivered in the beginning as music CDs which are a so called CD-DA (Compact Disc-Digital Audio), and the standard thereof has been extended to CDs for multimedia. As the representative standard of CD, there are standardized CD-DA format,
CD-ROM (Compact Disc-Read Only Memory) format,
CD-I (Compact Disc-Interactive) format, and
CD-ROM/XA (CD-ROM Extended Architecture) format.

The CD-DA format is the format for audio data. This CD-DA format is the format which provides the basis for other CD formats, and prescribes (specifies) the physical structure and the signal processing system of the disc.

The CD-ROM format is the format extended for computer data. In this CD-ROM format, as the physical block structure, two modes of the mode 1 where Error Detection Code (hereinafter abbreviated as EDC) and Error Correction Code (hereinafter abbreviated as ECC) are added and the mode 2 where EDC/ECC is omitted are standardized.

The CD-I format is the format extended so as to include picture data or character data, etc. in addition to audio data. The block structure in this CD-I format is the block structure of the mode 2 in the CD-ROM format. In this CD-I format, as the physical block structure, two modes of the form 1 in which EDC/ECC is added and the form 2 in which EDC/ECC is omitted are standardized.

The CD-ROM/XA format prescribes that, for the purpose of allowing computer data and audio data to be synchronous with each other, the computer data and the audio data are caused to be interleaved. The block structure in this CD-ROM/XA format is the block structure of the mode 2 in the CD-ROM format. In this CD-ROM/XA format, as the physical block structure, two modes of the form 1 in which EDC/ECC is added and the form 2 in which EDC/ECC is omitted are standardized.

Meanwhile, in recent years, there have been proposed CD-R (Compact Disc-Recordable) discs in which a recording surface on which organic (system) recording material is coated is provided on one surface of the disc of which size is the same as that of the compact disc so that arbitrary data can be written onto the recording surface by light beams. In the CD-R discs, the CD-MO (Compact Disc-Magneto Optical) format for rewritable CD and the CD-WO (Compact Disc-Write Once) format for write once type-CD are standardized. In addition, CDs of various formats as described above have been prepared by making use of the CD-R discs.

In the case of the format of CD, one track is of one collective file structure in which data has been written only once, or segments of audio data.

In the beginning, the CD-DA discs and/or the CD-ROM discs, etc. were reproduction (playback) only discs, and were single session (area) discs provided with single session constituted with one track or more consisting of audio track where audio data is recorded and/or data track where computer data is recorded. However, the (data) once writable CD-R discs are adapted so that plural sessions can be provided on the disc. Thus, multi-session discs utilizing such CD-R disc have been provided.

Meanwhile, audio data which can be recorded on the CD-R disc by the CD-DA format is 16 bit data. Accordingly, it is impossible to record audio data of the master tape recorded by the number of bits more than 16 bit, for example, as it is.

In view of the above, the so-called noise shaping or dither is utilized by the super bit mapping in which auditory sense is taken into consideration, or the like to record audio data more than 16 bits onto the CD-R disc by the CD-DA format, in the state where those audio data are caused to be set of 16 bit data, without injuring the sound quality.

By these technologies, CD-R discs recorded by the CD-DA format have been able to be reproduced by the ordinary CD player. However, since the data quantity is essentially decreased, it was impossible to reproduce the same sound as sound of the master tape.

Moreover, if the CD-ROM format is used, it becomes possible to record audio data of the number of bits more than 16 bits as described above onto the CD-R disc. However, since compatibility with CDs of the CD-DA format is lost, such CD-R discs cannot be reproduced by the ordinary CD player.

Further, there is restriction in the conventional format of the CD-R disc. Namely, e.g., if CD-R disc prepared in such a manner that areas respectively called audio session recorded by the CD-DA format and data session recorded by the CD-ROM format are mixed on the same disc by the so-called multi-session format is reproduced by the ordinary CD player, since codes which might not be recognized are recorded, there is the possibility that reproduction of audio data of the audio track recorded in the audio session may become impossible, and/or data of the data track recorded in the data session may be erroneously reproduced as audio data.

This invention has been made in view of actual circumstances as described above, and its object is to provide a recording medium which can maintain compatibility with the conventional CD player, and can be reproduced in the state of high sound quality at the reproducing apparatus of higher rank, a recording apparatus capable of recording audio data onto such a recording medium in the state where high sound quality is maintained, and a reproducing method and a reproducing apparatus for reproducing such recording medium in the state of high sound quality.

DISCLOSURE OF THE INVENTION

In order to solve the above-described problems, a recording medium of this invention includes a first recording area where a digital audio signal sampled at a predetermined sampling frequency and quantized by a predetermined number of bits is recorded, a first management area where information for carrying out management of the digital audio signal recorded in the first recording area is recorded, a second recording area where a digital audio signal corresponding to the digital audio signal recorded in the first recording area is recorded, and a second management area where information for carrying out management of the digital audio signal recorded in the second recording area is recorded.

Moreover, the digital audio signal recorded in the first recording area is digital audio signals of 2 channels, and the digital audio signal recorded in the second recording area is digital audio signals of 2 channels corresponding to the digital audio signals of 2 channels recorded in the first recording area.

Further, the digital audio signal recorded in the first recording area is one of data portions of high order bits and low order bits obtained by dividing the digital audio signal quantized by the predetermined number of bits, and the digital audio signal recorded in the second recording area is the other of the data portions of the digital audio signal quantized by the predetermined number of bits.

Further, the digital audio signal recorded in the first recording area is a digital audio signal obtained by down-sampling one digital audio signal obtained by band-dividing the digital audio signal sampled at the predetermined sampling frequency, and the digital audio signal recorded in the second recording area is the other digital audio signal obtained by band-dividing the digital audio signal sampled at the predetermined sampling frequency.

Further, the digital audio signal recorded in the second recording area is a compressed signal.

Further, time code corresponding to the first recording area is recorded in the second recording area.

Further, in order to solve the above-described problems, a recording apparatus of this invention is directed to a recording apparatus adapted for recording information onto a recording medium including plural areas, the apparatus comprising: a speech processing section for sampling an audio signal from a sound source at a predetermined sampling frequency, and for converting digital audio information thus obtained into information in a form adapted to be recorded onto the recording medium; and a recording section for recording the digital audio information converted at the speech processing section into a first reeording area and a second recording area constituting the plural areas of the recording medium.

Further, the speech processing section includes: a first speech processing section for sampling an audio signal from a first sound source at a predetermined sampling frequency, and for quantizing digital audio information thus obtained by a predetermined number of bits, and a second speech processing section for sampling an audio signal from a second sound source corresponding to the first sound source at a sampling frequency which is the same as the predetermined sampling frequency, and for compressing digital audio information thus obtained, and the recording section records the digital audio information from the first speech processing section into the first recording area of the recording medium, and for recording the digital audio information from the second speech processing section into the second recording area of the recording medium.

Further, the speech processing section includes: a quantizing section for sampling an audio signal from a sound source at a predetermined sampling frequency, and for quantizing digital audio information thus obtained by a predetermined number of bits; and a separating section for separating the digital audio information thus obtained from the quantizing section into information of high order bits and low order bits, and the recording section records the digital audio information of the high order bits from the separating section into the first recording area of the recording medium, and for recording the digital audio information of the low order bits from the separating section into the second recording area of the recording medium.

Further, the speech processing section includes: a quantizing section for sampling an audio signal from a sound source at a predetermined sampling frequency, and for quantizing digital audio information thus obtained by a predetermined number of bits; and a (frequency) band dividing section for band-dividing the digital audio information from the quantizing section at a frequency which is 1/n (n is integer) of the predetermined sampling frequency so that dividing into two groups is carried out, and the recording section records the digital audio information of one group of the two groups into the first recording area of the recording medium, and for recording the digital audio information of the other group into the second recording area of the recording medium.

Further, time code corresponding to the first recording area is recorded in the second recording area.

Further, the recording section includes a first recording head for recording digital audio information into the first recording area, and a second recording head for recording digital audio information into the second recording area.

Further, in order to solve the above-described problems, a reproducing method of this invention is directed to a reproducing method for reproducing digital audio information from a recording medium including a first recording area where digital audio information is recorded, a first management area where information for carrying out management of the digital audio information recorded in the first recording area is recorded, a second recording area where digital audio information corresponding to the digital audio information recorded in the first recording area is recorded, and a second management area where information for carrying out the digital audio information recorded in the second recording area is recorded, the method including: a first step of reading the information of the first management area by a reproduction head to discriminate on the management information which has been read whether or not the second recording area exists; a second step of moving the reproduction head to the second management area in the case where it has been discriminated at the first step that the second recording area exists; a third step of reading the information of the second management area by the reproduction head moved at the second step to read the digital audio information of the second recording area on the basis of the information to store the digital audio information which has been read into a first memory; a fourth step of moving the reproduction head to a data recording position within the first recording area where digital audio information corresponding to the digital audio information from the second recording area stored in the first memory at the third step is recorded; and a fifth step of reading the digital audio information of the first recording area by the reproduction head moved at the fourth step to store this digital audio information into a second memory, and to output the digital audio information stored in the first memory and the digital audio information stored in the second m Further, a speed for writing digital audio information into the first memory is higher than a speed for reading out digital audio information from the first memory, and a speed for writing digital audio information into the second memory is higher than a speed for reading out digital audio information from the second memory.

Further, the reproducing method includes: a sixth step of comparing a storage quantity of the second memory and a predetermined value; a seventh step such that when it is discriminated at the sixth step that the storage quantity of the second memory is above the predetermined value, a procedure is taken to move the reproduction head to a data recording position within the second recording area where digital audio information successive (continuous) to the digital audio information stored in the first memory, and to read the digital audio information: and an eighth step of storing the digital audio information of the second recording area which has been read at the seventh step into the first memory, and outputting the digital audio information stored in the first memory and the digital audio information stored in the second memory while taking synchronization therebetween.

Further, the digital audio information recorded in the first recording area is digital audio information of 2 channels, and digital audio information recorded in the second recording area is digital audio information of 2 channels corresponding to the digital audio information recorded in the first recording area.

Further, the digital audio information recorded in the first recording area is digital audio information of high order bits of digital audio information quantized by a predetermined number of bits after undergone sampling at a predetermined sampling frequency, and the digital audio information recorded in the second recording area is digital audio information of low order bits of the quantized digital audio information.

Further, the digital audio information recorded in the first recording area is digital audio information obtained by band-dividing, at a predetermined frequency, digital audio information quantized by a predetermined number of bits after undergone sampling at a predetermined sampling frequency so that grouping into digital audio information of the higher frequency band side and the lower frequency band side is carried out to sample the digital audio information of one group at a sampling frequency lower than the predetermined sampling frequency, and the digital audio information recorded in the second recording area is digital audio information obtained by compressing the digital audio information of the other group.

Further, the digital audio information recorded in the second recording area includes time code corresponding to the digital audio information of the first recording area.

Further, a reproducing method of this invention is directed to a reproducing method for reproducing digital audio information from a recording medium including a first recording area where digital audio information and address information are recorded in the state where they are multiplexed, a first management area where information for carrying out management of the digital audio information recorded in the first recording area is recorded, a second recording area where digital audio information and address information corresponding to the first recording area are recorded in the state where they are multiplexed, and a second management area where information for carrying out management of the digital audio information recorded in the second recording area is recorded, the method including: a first reading step of reading the digital audio information and the address information from the first recording area by a first reproduction section; a second reading step of reading the digital audio information and the address information from the second recording area by a second reproduction section; an output step of outputting, on the basis of the digital audio information and the address information obtained at the first reading step and the digital audio information and the address information obtained at the second reading step, the digital audio information while taking synchronization therebetween; a first discrimination step of discriminating whether or not information storage quantity of a memory section for temporarily storing the digital audio information from the second reproduction section is a predetermined value or more; a reproduction section stand-by step such that in the case where it is discriminated at the first discrimination step that the storage quantity of the information stored in the memory section is the predetermined value or more, a control is carried out such that the second reproduction section is caused to be in stand-by state; a second discrimination step of discriminaelow the predetermined value; and a reproduction section re-start step such that it is discriminated at the second discrimination step that the storage quantity is below the predetermined value, a control is carried out such that the second reproduction section is restarted.

Further, the digital audio information recorded in the first recording area is digital audio information of 2 channels, and the digital audio information recorded in the second recording area is digital audio information of 2 channels corresponding to the digital audio information recorded in the first recording area.

Further, the digital audio information recorded in the first recording area is digital audio information of high order bits of digital audio information quantized by a predetermined number of bits after undergone sampling at a predetermined sampling frequency, and the digital audio information recorded in the second recording area is digital audio information of low order bits of the quantized digital audio information.

Further, the digital audio information recorded in the first recording area is digital audio information obtained by band-dividing, at a predetermined frequency, digital audio information quantized by a predetermined number of bits after undergoing sampling at a predetermined frequency so that grouping into digital audio information of the higher frequency band side and the lower frequency band side is carried out to sample the digital audio information of one group at a sampling frequency lower than the predetermined sampling frequency, and the digital audio information recorded in the second recording area is digital audio information obtained by compressing the digital audio information of the other group.

Further, in order to solve the above-described problems, a reproducing apparatus of this invention is directed to a reproducing apparatus for reproducing digital audio information from a recording medium including a first recording area where digital audio information is recorded, a first management area where information for carrying out management of the digital audio information recorded in the first recording area is recorded, a second recording area where digital audio information corresponding to the digital audio information recorded in the first recording area is recorded, and a second management area where information for carrying out management of the digital audio information recorded in the second recording area is recorded, the apparatus comprising: reproducing means for reproducing the digital audio information from the recording medium, first memory means for storing the digital audio information which has been read from the first recording area by the reproducing means; second memory means for storing the digital audio information which has been read from the second recording area by the reproducing means, first discrimination means for discriminating whether or not quantity of data stored in the first memory means is a predetermined quantity or more, second discrimination means for discriminating whether or not quantity of data stored in the second memory means is a predetermined quantity or more, moving means for moving the reproducing means, and control means for conducting a control to move the reproducing means to the second recording area on the basis of the information of the first management area to store, into the second memory means, the digital audio information which has been read from the second recording area, whereby in the case where it is discriminated at the second discrimination means that quantity of data stored in the second memory means is the predetermined quantity or more, the control means is operative to move the reproducing means to the first recording area where digital audio information corresponding to the digital audio information stored in the second memory means is recorded to store, into the first memory means, the digital audio information which has been read from the first recording area to output the digital audio information from the first and second memory means while taking synchronization therebetween.

Further, the digital audio information recorded in the first recording area is digital audio information of 2 channels, and the digital audio information recorded in the second recording area is digital audio information of 2 channels corresponding to the digital audio information recorded in the first recording area.

Further, the digital audio information of the second recording area is compressed digital audio information.

Further, the digital audio information recorded in the first recording area is digital audio information of high order bits of digital audio information quantized by a predetermined number of bits after undergone sampling at a predetermined sampling frequency, and the digital audio information recorded in the second recording area is digital audio information of low order bits of the quantized digital audio information.

Further, the digital audio information recorded in the first recording area is digital audio information obtained by band-dividing, at a predetermined frequency, digital audio information quantized by a predetermined number of bits after undergone sampling at a predetermined sampling frequency so that grouping into digital audio information of the higher frequency band side and the lower frequency band side is carried out to sample the digital audio information of one group at a sampling frequency lower than the predetermined sampling frequency; and the digital audio information recorded in the second recording area is digital audio information obtained by compressing the digital audio information of the other group.

Further, the digital audio information recorded in the second recording area includes time code corresponding to the digital audio information recorded in the first recording area.

Further, a reproducing apparatus of this invention is directed to a reproducing apparatus adapted for reproducing digital audio information from a recording medium including a first recording area where digital audio information and address information are recorded in the state where they are multiplexed, a first management area where information for carrying out management of the digital audio information recorded in the first recording area is recorded, a second recording area where digital audio information and address information corresponding to the first recording area are recorded in the state where they are multiplexed, and a second management area where information for carrying out management of the digital audio information recorded in the second recording area is recorded, the apparatus comprising: first reproducing means for reading the digital audio information and the address information from the first recording area; second reproducing means for reading the digital audio information and the address information from the second recording area; memory means for storing the digital audio information from the second reproducing means; control means for controlling the memory means and the second reproducing means on the basis of the address information from the first recording area and the address information from the second recording area; mixing means for mixing the digital audio information reproduced by the first reproducing means and the digital audio information reproduced by the second reproducing means; and output means for outputting digital audio information mixed at the mixing means.

Further, the digital audio information recorded in the first recording area is digital audio information of 2 channels, and the digital audio information recorded in the second recording area is digital audio information of 2 channels corresponding to the digital audio information recorded in the first recording area.

Further, the digital audio information of the second recording area is compressed digital audio information.

Further, the digital audio information recorded in the first recording area is digital audio information of high order bits of digital audio information quantized by a predetermined number of bits after undergone sampling at a predetermined sampling frequency, and the digital audio information recorded in the second recording area is digital audio information of low order bits of the quantized digital audio information.

Further, the digital audio information recorded in the first recording area is digital audio information obtained by band-dividing, at a predetermined frequency, digital audio information quantized by a predetermined number of bits after undergone sampling at a predetermined sampling frequency so that grouping into digital audio information of the higher frequency band side and the lower frequency band side is carried out to sample the digital audio information of one group at a sampling frequency lower than the predetermined sampling frequency; and the digital audio information recorded in the second recording area is digital audio information obtained by compressing the digital audio information of the other group.

In accordance with the recording medium of this invention, it is possible to prepare a recording medium, e.g., a disc-shaped recording medium such that data are respectively collectively recorded in the first session consisting of the first management area and the first recording area and the second session consisting of the second management area and the second recording area. Further, data can be respectively recorded by different formats with respect to the first session and the second session. In addition, digital audio information to be recorded by the CD-DA format is recorded into the first session, and digital audio information attached to the digital audio information recorded in the first session is recorded into the second session, thereby making it possible to prepare a recording medium adapted so that audio data can be recorded in the state of high sound quality and compatibility with the conventional CD player is maintained.

Moreover, the recording medium is caused of a structure such that digital audio information of 4 channels are recorded into respective sessions by 2 channels so that the digital audio information is recorded at least into the first session by the CD-DA format, thereby making it possible to prepare a recording medium adapted so that audio data can be recorded in the state of high sound quality and compatibility with the conventional CD player is maintained.

Further, e.g., the recording medium is caused to be of a structure such that the portion (digital audio information of bits) up to 16 bits of digital audio information more than 16 bits is recorded into the first session by the CD-DA format, and digital audio information of the remaining bits is recorded into the second session, e.g., by the CD-ROM format, thereby making it possible to prepare a recording medium adapted so that audio data can be recorded in the state of high sound quality and compatibility with the conventional CD player is maintained.

In addition, e.g., the recording medium is caused to be of a structure such that digital audio information sampled at a sampling frequency prescribed (specified) by the ordinary CD-DA format is band-divided at a predetermined frequency, e.g., a frequency which is one half (½) of the sampling frequency so that grouping into digital audio information of the higher frequency band side and the lower frequency band side of the frequency to down-sample the digital audio information of the lower frequency band side to record it into the first session by the CD-DA format, and to record the digital audio information of the higher frequency band side into the second session, e.g., by the CD-ROM format, thereby making it possible to prepare a recording medium adapted so that audio data can be recorded in the state of high sound quality and maintain compatibility with the conventional CD player is maintained.

Moreover, in accordance with the recording apparatus of this invention, the speech processing section samples an audio signal from the sound source at a predetermined sampling frequency to allow it to be digital data, and to convert the digital data into data in a form adapted to be recorded onto a recording medium including plural recording areas. In this case, the recording medium is assumed to be constituted by the first session of the structure including the first management area and the first recording area, and the second session of the structure including the second management area and the second recording area, and the speech converting section converts digital data to be recorded into the first session into CD-DA format data, and converts digital data to be recorded into the second session into CD-ROM format data. As described above, the recording section records the CD-DA format data into the first recording area, and records the CD-ROM format data into the second recording area.

Further, in the case where the speech processing section is composed of the first speech processing section and the second speech processing section, the first speech processing section changes audio signals of 2 channels from the first sound source into digital data thereafter to quantize the digital data to thereby convert it into CD-DA format data, and the second speech processing section changes, e.g., audio signals of 2 channels from the second sound source corresponding to the first sound source into digital data thereafter to compress the digital data to thereby convert it into CD-ROM format data. In addition, the recording section records digital data from the first speech processing section into the first recording area, and records digital data from the second speech processing section into the second recording area.

Further, in the case where the speech processing section is composed of the quantizing section and the separating section, the quantizing section samples an audio signal from the sound source at a predetermined sampling frequency to convert it into sampled data (digital data), and to quantize this sampled data (digital data) to convert it into digital data more than 16 bits, and the separating section allows the digital data more than 16 bits obtained at the quantizing section to undergo separating conversion such that, e.g., digital data of high order 16 bits is changed into CD-DA format data and digital data of other low order bits is changed into CD-ROM format data. The recording section records, e.g., CD-DA format data into the first recording area, and records the CD-ROM format data into the second recording area.

Further, in the case where the speech processing section is composed of the quantizing section and the band-dividing section, the quantizing section samples an audio signal from the sound source at a predetermined sampling frequency to convert it into sampled data (digital data), and quantizes this sampled data (digital data) to thereby convert it into digital data more than 16 bits, and the band-dividing section band-divides the digital data at a frequency which is 1/n (n is integer) of the predetermined sampling frequency. Namely, an audio signal is quantized after undergone sampling at a sampling frequency twice greater than 44.1 kHz which is the sampling frequency prescribed (specified) by, e.g., the CD-DA format to divide the quantized digital data into two groups of digital data of the higher frequency band side and the lower frequency band side of the frequency of 44.1 kHz to convert the digital data of the lower frequency side into the CD-DA format data, and to convert the digital data of the higher frequency side into CD-ROM format data. The recording section records the CD-DA format data into the first recording area, and records the CD-ROM format data into the second recording area.

Further, in the case where the recording section is composed of the first recording head and the second recording head, the first recording head carries out recording by the CD-DA format with respect to the first recording area, and the second recording head carries out recording by the CD-ROM format with respect to the second recording area.

Further, in accordance with the reproducing method of this invention, at the first step, information of the first management area of the recording medium is read, whereby whether or not the second recording area exists is discriminated on the basis of the management information. When it is discriminated at the first step that the second recording area exists, access to the second management area where information for carrying out digital audio information of the second recording area is recorded is provided at the second step. At the third step, the digital audio information of the second recording area is read on the basis of the management information of the second management area to which access has been provided at the second step, and the digital audio information thus read is stored into the first memory. At the fourth step, access to data recording position within the first recording area where digital audio information corresponding to the digital audio information stored in the first memory is recorded is provided. At the fifth step, the digital audio information recorded at the data recording position accessed at the fourth step is read out from the first recording area, and the digital audio information thus read out is stored into the second memory. Thus, the digital audio information stored in the first memory at the third step and the digital audio information stored in the second memory is outputted in a manner synchronous with each other.

Further, at the sixth step, the storage quantity of data of the second memory in which digital audio information is stored at the fifth step and a predetermined value, e.g., the allowed storage quantity of the first memory are compared with each other. When the storage quantity of data of the second memory is above the predetermined value, the processing operation proceeds to the seventh step. At the seventh step, access to data recording position within the second recording area where digital audio information successive (subsequent) to the digital audio information stored in the first memory is recorded is provided. Thus, this digital audio information is read out. At the eighth step, digital audio information from the second recording area which has been read out at the seventh step is temporarily stored into the first memory, and the digital audio information stored in this first memory and the digital audio information stored in the second memory at the fifth step are outputted in a manner synchronous with each other.

Further, in the case where there is used a recording medium such that digital audio information of 2 channels are recorded in the first recording area and digital audio information of 2 channels corresponding to the digital audio information recorded in the first recording area are recorded in the second recording area, at the fifth step, the digital audio information recorded in the first recording area and the digital audio information recorded in the second recording area are synchronously reproduced. Thus, high sound quality digital audio information of multi-channel is outputted.

Further, e.g., in the case where there is used a recording medium such that the portion (digital audio information of bits) up to 16 bits of digital audio information more than 16 bits is recorded in the first recording area, and digital audio information of the remaining bits is recorded in the second area, at the fifth step, the digital audio information recorded in the first recording area and the digital audio information recorded in the second recording are synchronously reproduced. Thus, high sound quality digital audio information of which number of bits has been increased is outputted.

Further, in the case where there is used a recording medium such that, e.g., digital audio information obtained by band-dividing digital audio information sampled at a sampling frequency prescribed (specified) by the ordinary CD-DA format at a predetermined frequency, e.g., a frequency which is one half of the sampling frequency to down-sample the digital audio information of the lower frequency band side with respect to the frequency which is one half of the sampling frequency is recorded in the first recording area, and digital audio information obtained by compressing the digital audio information of the higher frequency band side is recorded in the second recording area, at the fifth step, the compressed digital audio information is restored (reconstructed), and the digital audio information thus restored and the digital audio information recorded in the first recording area are synchronously reproduced. Thus, high sound quality digital audio information of the so-called high-sampling system (i.e., sampling frequency has been increased) is outputted.

Further, in accordance with the reproducing method of this invention, at the first reading step, the first reproduction section reads digital audio information and address information from the first recording area of the recording medium. At the second reading step, the second reproduction section reads digital audio information and address information from the second recording area of the recording medium. At the output step, digital audio information based on both digital audio information recorded in the respective recording area is outputted on the basis of both address information recorded in the respective recording area. At the first discrimination step, whether or not storage quantity of the digital audio information from the second reproduction section temporarily stored in the memory section reaches a predetermined quantity, e.g., allowed storage quantity of the memory section is discriminated. The reproduction section standby step is the step executed when it is discriminated at the first discrimination step that quantity of information stored in the memory section reaches the allowed storage quantity. At this step, the second reproduction section is controlled so that it is in stand-by state. At the second discrimination step, whether or not the information storage quantity of the memory section is below the predetermined quantity, i.e., whether or not sufficient room (memory capacity) is provided (ensured) is discriminated. The reproduction section re-start step is the step executed when it is discriminated at the second discrimination step that sufficient room (memory capacity) is provided (ensured) in the memory section. At this step, the second reproduction section is controlled so that it is restarted.

Further, in the case where there is used a recording medium such that digital audio information of 2 channels are recorded in the first recording area, and digital audio information of 2 channels corresponding to the digital audio information recorded in the first recording area are recorded in the second recording area, at the first reading step, the digital audio information and the address information recorded in the first recording area are read. At the second reading step, the digital audio information and the address information recorded in the second recording area are read. At the output step, there are synchronously reproduced both digital audio information recorded in the respective recording areas on the basis of address information recorded in the respective recording areas which have been read at the first and second reading steps. Thus, high sound quality digital audio information of the multi-channel is outputted.

Further, e.g., in the case where there is used a recording medium such that the portion (digital audio information of bits) up to 16 bits of digital audio information more than 16 bits is recorded in the first recording area, and digital audio information of the remaining bits is recorded in the second recording area, at the first reading step, the digital audio information and the address information recorded in the first recording area are read. At the second reading step, the digital audio information and the address information recorded in the second recording area are read. At the output step, there are synchronously outputted both digital audio information recorded in the respective recording areas on the basis of address information recorded in the respective recording areas which have been read at the first and second reading steps. Thus, high sound quality digital audio information of which number of bits has been increased is outputted.

Further, e.g., in the case where there is used a recording medium such that digital audio information obtained by band-dividing digital audio information sampled at a sampling frequency prescribed (specified) by the ordinary CD-DA format at a predetermined frequency, e.g., a frequency which is one half of the sampling frequency to down-sample the digital audio information of the lower frequency band side with respect to the frequency which is one half of the sampling frequency is recorded in the first recording area, and information obtained by compressing the digital audio information of the higher frequency band side is recorded in the second recording area, at the first reading step, the digital audio information and the address information recorded in the first recording area are read. At the second reading step, compressed digital audio information and address information recorded in the second recording area are read, and the compressed information is further restored (reconstructed). At the output step, there are synchronously outputted both digital audio information recorded in the respective recording areas on the basis of address information recorded in the respective recording areas. Thus, high sound quality digital audio information of the so-called high-sampling system (i.e., sampling frequency has been increased) is outputted.

Further, in accordance with the reproducing apparatus of this invention, the reproducing means reproduces digital audio information from the recording medium, the first memory means stores digital audio information from the first recording area of the recording medium, and the second memory means stores digital audio information from the second recording area of the recording medium. The first discrimination means discriminates whether or not quantity of data stored in the first memory means reaches a predetermined quantity, e.g., allowed storage quantity, and the second discrimination means discriminates whether or not quantity of data stored in the second memory means reaches a predetermined quantity, e.g., allowed storage quantity. The moving means moves the reproduction means. The control means conducts a control to allow the moving means to undergo movement operation on the basis of information of the first management area where information for carrying out management of the first recording area is recorded to allow it to provide access to the second recording area to allow the second memory means to store digital audio information read out from the data recording position to which access has been provided, whereby when it is discriminated on the basis of a result from the second discrimination means that quantity of data stored in the second memory means is the predetermined quantity or more, the control means conducts a control to allow the moving means to undergo movement operation to allow it to provide access to the first recording area to allow the first memory means to store digital audio information read out from the data recording position to which access has been provided, and to conduct a control to output digital audio information from the first and second memory means in a manner synchronous with each other.

Further, in the case where there is used a recording medium such that digital audio information of 2 channels are recorded in the first recording area, and digital audio information of 2 channels corresponding to the digital audio information recorded in the first recording area are recorded in the second recording area, the first memory means stores digital audio information recorded in the first recording area, and the second memory means stores digital audio information recorded in the second recording area. The control means carries out control of the first and second memory means to allow the respective memory means to synchronously output the digital audio information stored therein. Thus, high sound quality digital audio information of multi-channel is outputted.

Further, e.g., in the case where there is used a recording medium such that the portion (bits of digital audio information of bits) up to 16 bits of digital audio information more than 16 bits is recorded in the first recording area, and digital audio information of the remaining bits is recorded in the second recording area, the first memory means stores digital audio information recorded in the first recording area, and the second memory means stores digital audio information recorded in the second recording area. The control means controls the first and second memory means to allow the respective memory means to synchronously output digital audio information stored therein. Thus, high sound quality digital audio information of which number of bits has been increased is outputted.

Further, e.g., in the case where there is used a recording medium such that digital audio information obtained by band-dividing digital audio information sampled at a sampling frequency prescribed (specified) by the ordinary CT-DA format at a predetermined frequency, e.g., a frequency which is one half of the sampling frequency to down-sample the digital audio information of the lower frequency band side with respect to the frequency (band) which is one half of the sampling frequency is recorded in the first area, and information obtained by compressing the digital audio information of the higher frequency band side is recorded in the second recording area, the first memory means stores the digital audio information recorded in the first recording area, and the second memory means stores compressed digital audio information recorded in the second recording area. The control means conducts a control to restore (reconstruct) the compressed digital audio information, and conducts a control to allow the first memory means to output digital audio information stored therein and the restored digital audio information in a manner synchronous with each other. Thus, high sound quality digital audio information of the so-called high-sampling system (i.e., sampling frequency has been increased) is outputted.

Further, in accordance with the reproducing apparatus of this invention, the first reproducing means reads digital audio information and address information from the first recording area of the recording medium, and the second reproduction means reads digital audio information and address information from the second recording area of the recording medium. The memory means stores digital audio information from the second reproduction means. The control means carries out, on the basis of both address information stored in the respective memory means, such a control to allow the second reproduction means to be in stand-by state when information storage quantity of the memory means reaches the allowed quantity. The mixing means mixes the digital audio information which has been read by the first reproducing means and the digital audio information from the memory means, and the output means outputs digital audio information mixed at the mixing means.

Further, in the case where there is used a recording medium such that digital audio information of 2 channels are recorded in the first recording area and digital audio information of 2 channels corresponding to the digital audio information recorded in the first recording area are recorded in the second recording area, the first reproducing means reads digital audio information and address information recorded in the first recording area, and the second reproducing means reads digital audio information and address information recorded in the second recording area. The mixing means mixes, on the basis of the address information recorded in the respective recording areas which have been read by the first and second reproducing means, both digital audio information recorded in the respective recording areas while taking synchronization therebetween. The output means outputs high sound quality digital audio information of multi-channel.

Further, e.g., in the case where there is used a recording medium such that the portion (bit of digital audio information) up to 16 bits of digital audio information more than 16 bits is recorded in the first recording area, and digital audio information of the remaining bits is recorded in the second recording area, the first reproducing means reads digital audio information and address information recorded in the first recording area, and the second reproducing means reads digital audio information and address information recorded in the second recording area. The mixing means mixes, on the basis of address information recorded in the respective recording areas which have been read by the first and second reproducing means, both digital audio information recorded in the respective recording areas while taking synchronization therebetween. The output means outputs high sound quality digital audio information of which number of bits has been increased.

In addition, e.g., in the case where there is used a recording medium such that digital audio information obtained by band-dividing digital audio information sampled at a sampling frequency prescribed (specified) by the ordinary CD-DA format at a predetermined frequency, e.g., a frequency which is one half (½) of the sampling frequency to down-sample the digital audio information of the lower frequency band side with respect to the band of the frequency which is one half (½) of the sampling frequency is recorded in the first recording area, and information obtained by compressing the digital audio information of the higher frequency band side is recorded in the second recording area, the first reproducing means reads digital audio information and address information recorded in the first recording area, and the second reproducing means reads compressed digital audio information and address information recorded in the second recording area. The mixing means mixes, on the basis of the address information which has been read by the first reproducing means and address information obtained, e.g., by allowing compressed information to undergo decoding processing at a decoding section, both digital audio information recorded in the respective recording areas while taking synchronization therebetween. The output means outputs high sound quality digital audio information of the so-called high-sampling system (i.e., sampling frequency has been increased).

BRIEF DESCRIPTION OF THE DRAWINGS

FIG. 4 is a view showing data format of Q channel of the sub coding.

FIG. 5 is a view showing data format of Q channel recorded in management area of the recording medium.

FIGS. 11A–11C are a block diagram and views showing the configuration of a third modified example of the recording apparatus.

FIGS. 20A–20C are a block diagram and views showing the configuration of a second embodiment of the reproducing apparatus to which this invention is applied.

BEST MODE FOR CARRYING OUT THE INVENTION

Preferred embodiments of a recording medium, a recording apparatus, a reproducing method, and a reproducing apparatus will now be described with reference to the attached drawings. In the following description, explanation will be given by taking the example where CD-R disc which is the disc-shaped recording medium is used as the recording medium, the example where a recording apparatus for disc-shaped recording medium which is adapted for recording digital audio information onto such a CD-R disc is used as the recording apparatus, and the example where a reproducing method and a reproducing apparatus for disc-shaped recording medium which are adapted for reproducing digital audio information recorded on such a CD-R disc are used as the reproducing method and the reproducing apparatus.

Figures 1A, 1B:
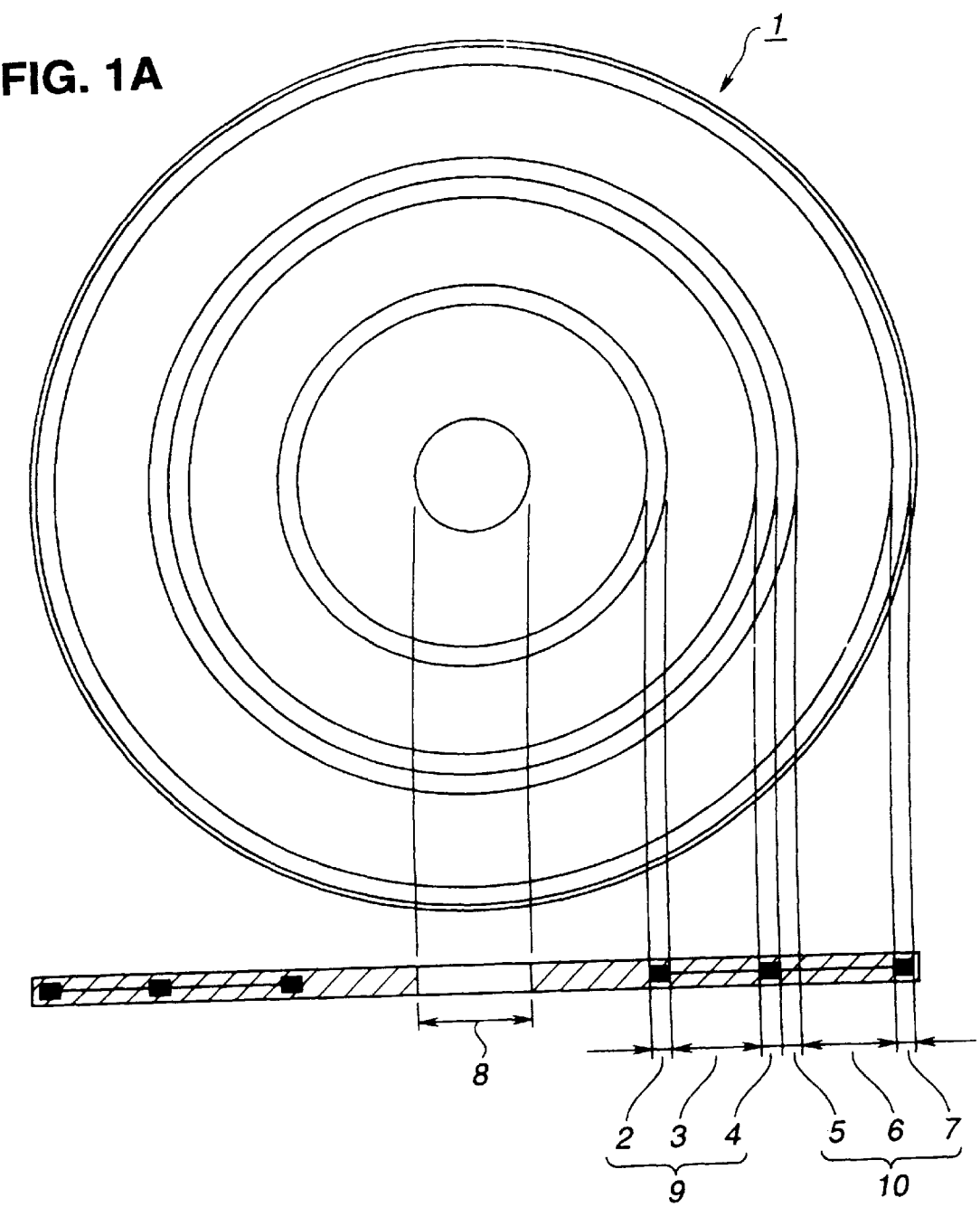
FIGS. 1A and 1B are views showing the configuration of a recording medium to which this invention is applied.

For example, as shown in FIGS. 1A–1B, CD-R disc 1 includes a first recording area 3 where a digital audio signal (information) sampled at a predetermined sampling frequency and quantized by a predetermined number of bits is recorded, a first management area 2 where information for carrying out management of the digital audio signal recorded in the first recording area is recorded, a second recording area 6 where a digital audio signal corresponding to the digital audio signal recorded in the first recording area 3 is recorded, and a second management area 5 where information for carrying out management of the digital audio signal recorded in the second recording area 6 is recorded.

Moreover, at the CD-R disc 1, a center hole 8 is provided at the central portion thereof. This CD-R disc is the so-called multisession disc where a first session 9 is formed by the first management area 2, the first recording area 3 and a first lead-out area 4 corresponding to these areas, and a second session 10 is formed by the second management area 5, the second recording area 6 and a second lead-out area 7 corresponding to these areas. In this case, data of the CD-DA format may be written (recorded) into the first session 9, and data of the CD-ROM format may be written into the second session 10.

Prior to explanation management of address information on the recording medium of this invention, a sub coding frame will now be described.

As the error correction code of the CD system such as CD-DA or CD-ROM, etc., CIRC (Cross Interleaved Reed Solomon Code) is employed. In this CD system, signals recorded on the disc-shaped recording medium are signals sampled at a sampling frequency of 44.1 kHz. In addition, these sampled data are collected into respective one CIRC frames every data of 6 sampling areas.

Figure 2:
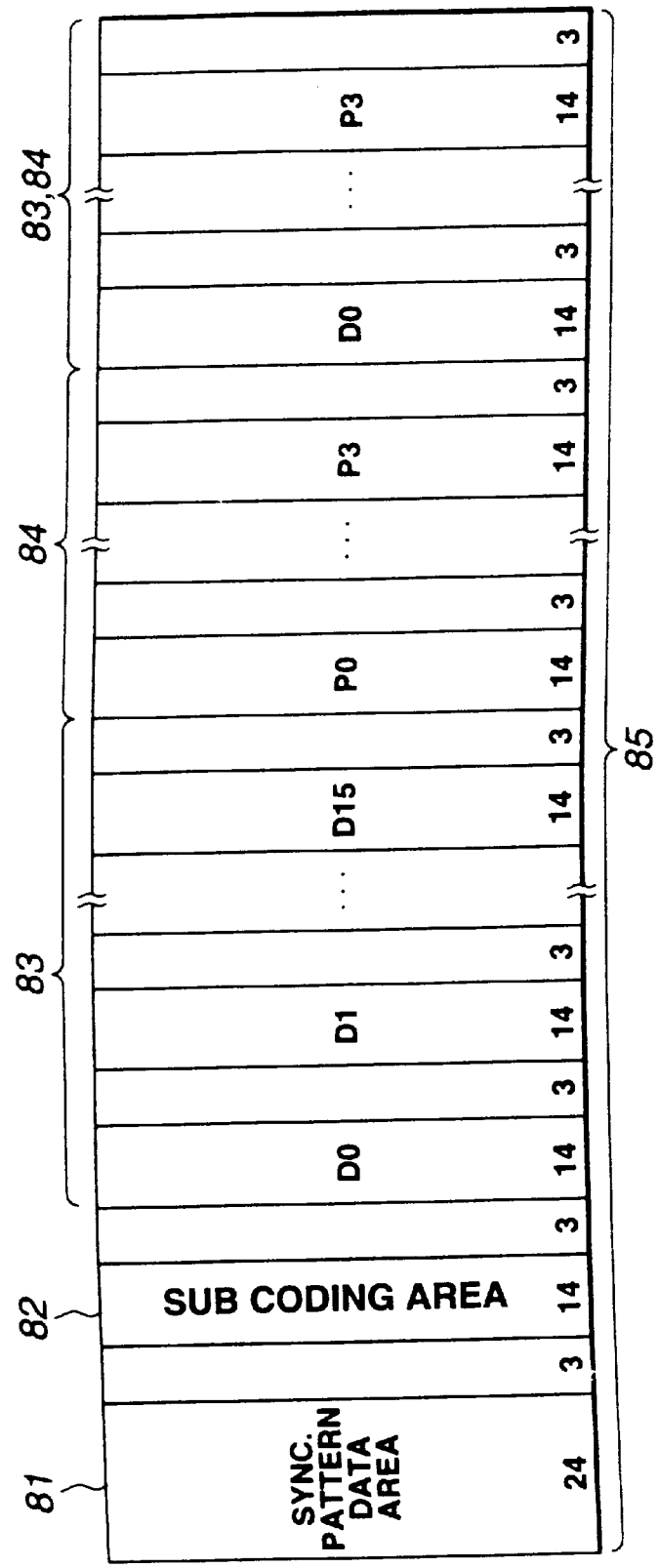
FIG. 2 is a view for explaining CIRC frame which is data format of the recording medium.

The format of signals collected into respective one CIRC frames is such that, as shown in FIG. 2, for example, there are provided, within each CIRC frame 85, a synchronization (sync.) pattern data area 81 of 24 bits, a sub coding area 82 of 14 bits, a program data area 83 consisting of 16 program data D0–D15 respectively having 14 bits, a parity data area 84 consisting of 4 parity data P0–P3 respectively having 14 bits, a different program data area 83, and a different parity data area 84. Moreover, in order to couple data of respective areas, blank areas of 3 bits are provided with respect to respective portions. Accordingly, each CIRC frame 85 includes of data 724 bits in total.

Figure 3:
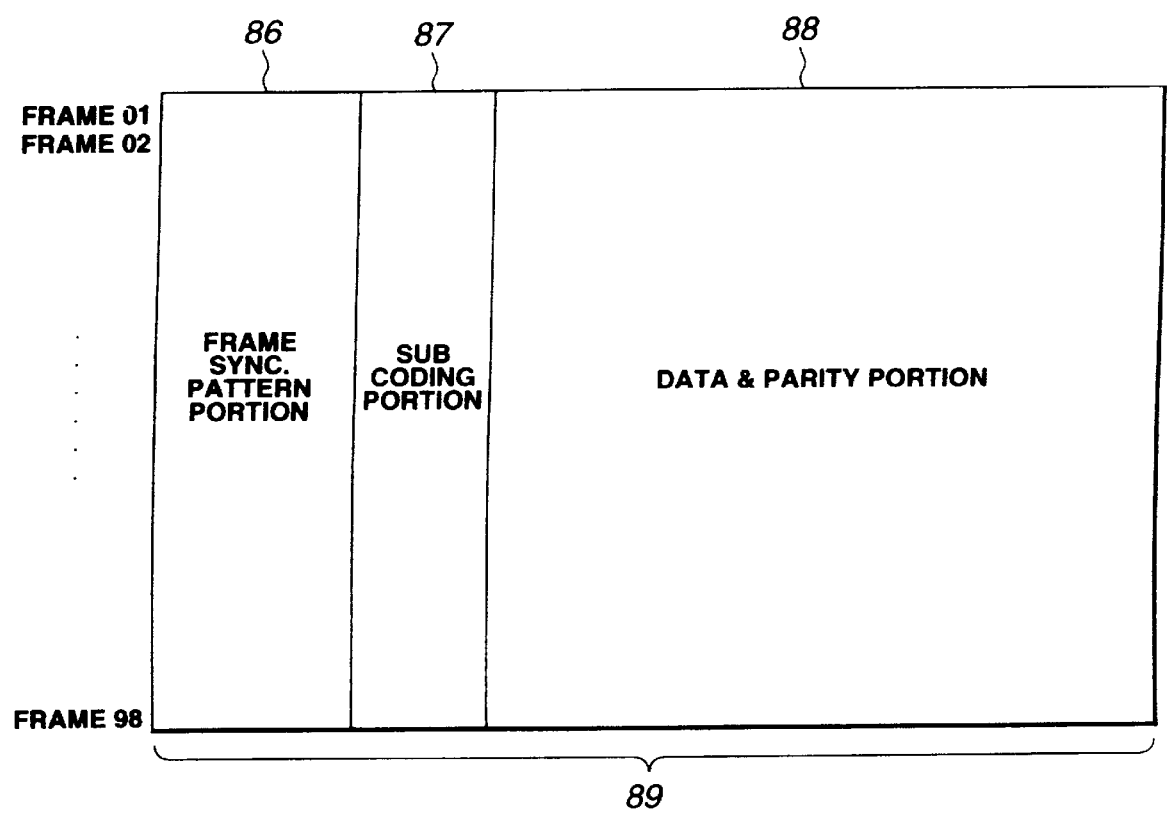
FIG. 3 is a view for explaining sub coding based on the CIRC frame.

Further, the state where 98 CIRC frames 85 are collected (gathered) to couple data of respective areas of the respective CIRC frames 85 after undergoing sequencing is shown in FIG. 3.

As shown in the FIG. 3 mentioned above, each block 89 formed by collecting 98 CIRC frames 85 consists of frame synchronization (sync.) pattern portion 86, sub coding portion 87 and data & parity portion 88.

In addition, the sub coding portion 87 includes synchronization (sync.) pattern of 98 CIRC frames, and data portions defined by eight symbols of P, Q, R, S, T, U, V, W. Particularly, the data portions defined by symbols of P, Q are used for control of access operation of the reproducing apparatus.

In this case, in respective areas shown in FIG. 1, addresses for indicating absolute positions on the CD-R disc 1 are given (allocated). These addresses are caused to undergo management by the data portion defined by the symbol of Q.

FIG. 4 shows the format of the first session 9, i.e., the data portion defined by the symbol of Q in the CD-DA format.

The data structure prescribed (provided) by this format is of the data configuration in which information frames 120 each consisting of track No. portion 101, index portion 102, elapsed time portion 110, 0 (zero) portion 106 and absolute time portion 111 are repeated. More particularly, the elapsed time portion 110 consists of min. (minutes) component portion 103, sec. (second) component portion 104 and frame No. component portion 105, and the absolute time portion 111 similarly consists of min. component portion 107, sec. component portion 108 and frame No. component portion 109. The frame No. component portions 105, 109 are both numerals for further minutely dividing 1 second.

Moreover, data of respective portions consist of data of 8 bits, and are represented by two digits (figures) represented by BCD (Binary Coded Decimal), for example.

In FIG. 4, in the case where data TNO of the track No. portion 101 is "01"–"99", this data TNO represents movement No. so called track No. indicating order of data recorded into the first recording area 3. At the elapsed time portion 110 and the absolute time portion 111, position where data corresponding to track No. in the first recording area 3 is recorded in the data & parity portion 88 is indicated. Namely, this data serves as address of the data & parity portion 88.

Further, the index portion 102 is the portion provided by further minutely dividing the movement. In this example, in the case where data IX of the index portion 102 is "00", this data IX indicates that the information frame 120 is the information frame in which data indicating pause area between movements is recorded. Particularly, start position of pause preceding (earlier) by one movement is caused (assumed) to be 0 min. 0 sec. 0 frame, and the above-mentioned data IX is used as the position of reference of data indicated at the elapsed time portion 110 and the absolute time portion 111. In addition, 0 (zero) is inserted into the 0 portion 106.

In this example, times from the starts of respective movements are recorded in the elapsed time section 110. These times are continued to be added until the pause area appears, and start for a second time from 0 (zero) when the track No. is updated. On the contrary, times added from position of reference or absolute times are recorded in the absolute time portion 111.

Moreover, in the case where data TNO of the track No. portion 101 is "AA", this data TNO indicates that the information frame 120 is information frame of the first lead-out area 4.

Particularly, in the case where data TNO is "00", this data TNO indicates that the information frame 120 is data within the first management area 2. The format in this case is repetition of the data structure shown in FIG. 5.

In FIG. 5, in the case where data PO of point portion 112 is, e.g., "00"–"99", this data PO indicates that the information frame 120 is the information frame indicating absolute times at which respective movements indicated by the data PO start, and respective data recorded in the absolute time portion 111 indicate absolute times at which respective movements start. In this example, the start position of the first pause is caused (assumed) to the 0 hour 0 min. 0 frame.

Moreover, in the case where data PO is "AO", this data PO indicates that the information frame 120 is the information frame in which the first movement No. is indicated, and data PMIN recorded in the min. component portion 107 of the absolute time portion 111 indicates the first movement No., and "00" is recorded as data PSEC, PFR in the min. component portion 107 and the sec. component portion 108.

Further, in the case where data PO is "A1", this data PO indicates that the information frame 120 is information frame in which the last movement No. is indicated. Last movement No. is recorded as data PMIN in the min. component portion 107, and "00" is recorded as data PSEC, PFR in the sec. component portion 108 and the frame No. component portion 109.

In addition, in the case where data PO is "A2", this data PO indicates that the information frame 120 is the information frame in which absolute time at which the first lead-out area 4 starts is indicated. Absolute time at which the first lead-out area 4 starts is recorded as data PMIN, PSEC, PFR in the absolute time portion 111.

In this example, in any case described above, "00" is recorded in respective data portions of the elapsed time portion 110.

Further, presence or absence of the second session 10 is also indicated at the point portion 112. For example, when "BO" is assumed to be written as data PO in the point portion 112, this data PO indicates that the second management area 5 is provided at the outer circumferential portion of the pause portion after the first lead-out area 4, and absolute time indicating this position is indicated, e.g., at the min. component portion 103, the sec. component portion 104 and the frame No. portion 105 of the elapsed time portion 110. It is to be noted that absolute time indicating start position of the second management area 5 may be recorded not only in the elapsed time portion 110, but also in the absolute.time portion 111.

Further, in the case where data corresponding to data recorded in the first recording area 3 is recorded in the second recording area 6, information frame in which the point portion 112 is "E0" is provided. In the case where such information frame is absent, it is indicated that corresponding disc is a disc such that only character data is recorded in the second management area 5 of the second session 10, and no data is recorded in the second recording area 6, which is so-called disc with character.

It is to be noted that while the example where information frame in which "B0" is recorded in the point portion 112 is provided as discrimination data indicating presence or absence of the second session 10 has been taken, this invention is not limited to such implementation, but information frame in which "C0" is recorded may be employed as the discrimination data. While information frame in which "E0" is recorded is provided as discrimination data for discriminating between the CD-R disc 1 and the disc with character, this invention is not limited to such implementation also in this case, but any other kind of information frames may be used.

In addition, similarly, digital audio information of the second recording area 6 is caused to undergo management as described above as the ordinary CD-ROM format by the information frame of the second management area 5.

A more practical example of the CD-R disc will now be described in conjunction with a first embodiment of a recording apparatus for recording data onto CD-R disc as described above.

Figure 6:
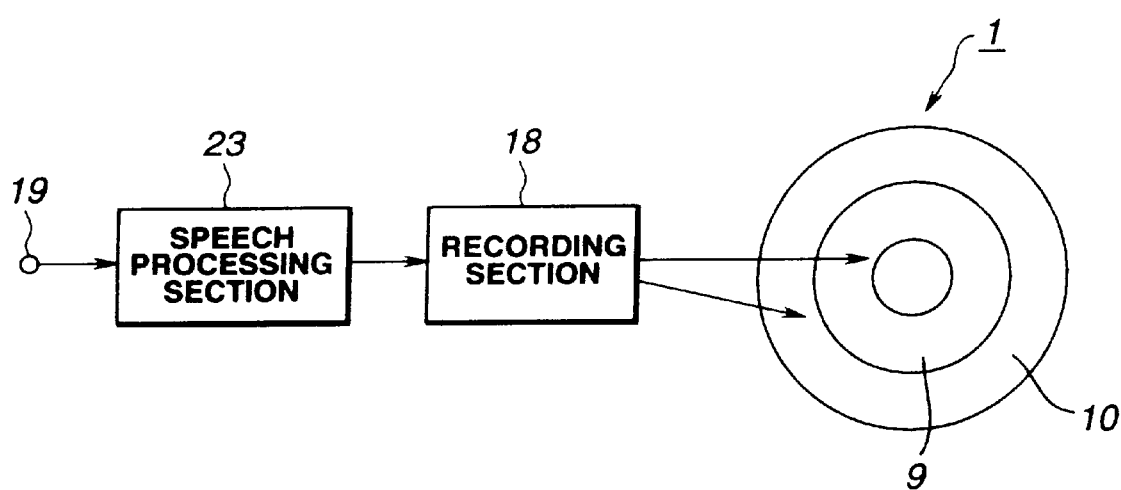
FIG. 6 is a block diagram showing the configuration of a first embodiment of a recording apparatus to which this invention is applied.

As shown in FIG. 6, for example, the recording apparatus of this first embodiment is the recording apparatus adapted for recording information onto CD-R disc 1 including plural recording areas, and includes a speech processing section 23 for sampling an audio signal from the sound source at a predetermined sampling frequency, and for converting digital audio information (signal) thus obtained into digital audio information in a form adapted to be recorded onto the CD-R disc 1, and a recording section 18 for recording the digital audio information processed at the speech processing section 23 into the first session 9 and the second session 10 of the CD-R disc 1.

Figure 7:
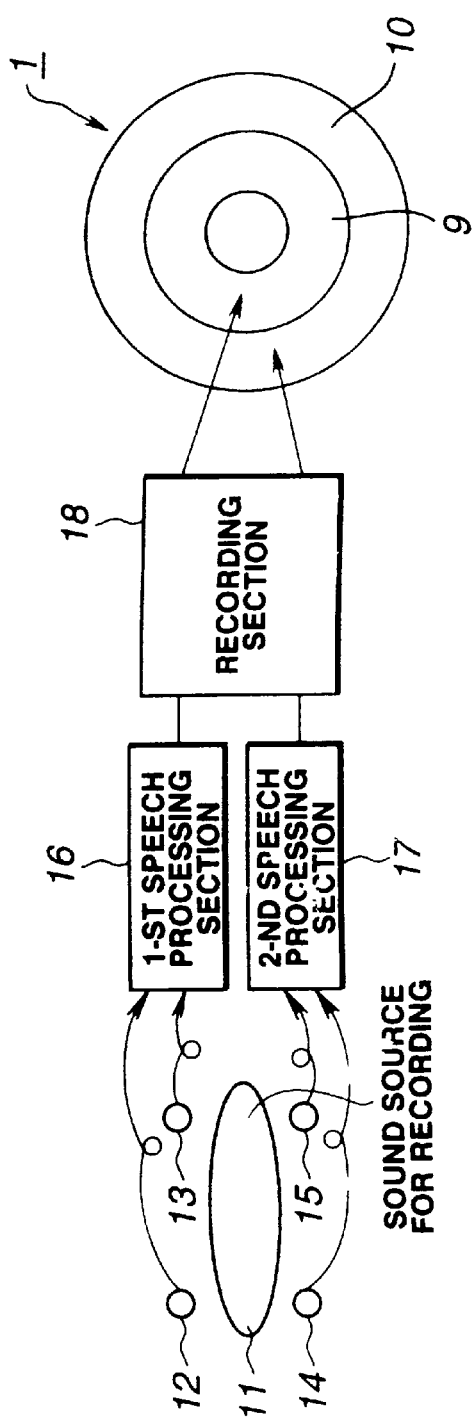
FIG. 7 is a block diagram showing the configuration of speech processing section of the recording apparatus.

Moreover, as shown in FIG. 7, for example, the speech processing section 23 includes a first speech processing section 16 for sampling an audio signal from a first sound source at a predetermined sampling frequency, and for quantizing digital audio information thus obtained by a predetermined number of bits, and a second speech processing section 17 for sampling an audio signal from a second sound source corresponding to the first sound source at the same sampling frequency as the predetermined sampling frequency, and for compressing digital audio information thus obtained. In addition, the recording section 18 records the digital audio information from the first speech processing section 16 into the first recording area 3 of the first session 9, and records the digital audio information from the second speech processing section. 17 into the second recording area 6 of the second session 10.

In more practical sense, a first forward microphone 12 and a second forward microphone 13 are microphones for forward channels, and a first backward microphone 14 and a second backward microphone 15 are microphones for backward channels. In this case, the so-called multi-channel including plural channels is constituted by the forward channels and the backward channels.

Thus, audio signals of the forward channels, i.e., 2 channels from the forward microphones 12, 13 are delivered to the first speech processing section 16. The first speech processing section 16 samples these audio signals of the forward channels, e.g., at a sampling frequency of 44.1 kHz prescribed (specified) by the CD-DA format thereafter to implement 16 bit linear quantization thereto to deliver quantized data to the recording section 18. The recording section 18 records the quantized data thus delivered into the first recording area 3 of the first session 9.

Audio signals of backward channels, i.e., 2 channels from backward microphone 14, 15 are delivered to the second speech processing section 17. The second speech processing section 17 similarly samples audio signals of backward channels, e.g., at the sampling frequency of 44.1 kHz to carry out compression by using, e.g., the algorithm of ATRAC (Adaptive Transform Acoustic Coding) to carry out bit compression into data size of substantially ⅕ by exhibiting the auditory sense characteristic. The recording section 18 records this compressed data into the second recording area 6 of the second session 10.

At this time, as described above, information frame in which the point portion 112 is defined as, e.g., "B0" or "C0" and information frame in which the point portion 112 is defined as "E0" are recorded into the first management area 2, and information frame in which the point portion 112 is defined as, e.g., "D1" is recorded into the second management area 5.

Meanwhile, in the conventional CD-DA format, digital audio information of 4 channels can be recorded only by the time which is one half of the recordable time of the ordinary digital audio information of 2 channels at the longest. To the contrary, the recording apparatus to which this invention is applied has improved the above-mentioned drawback, thereby making it possible to realize a recording medium which is capable of carrying out long time recording of digital audio information of multi-channel represented by the digital audio information of 4 channels and is capable of reproducing digital audio information recorded by the CD-DA format.

It is to be noted that explanation has been given in connection with the actual example (embodiment) in which, as discrimination data indicating CD-R disc such that digital audio information of the CD-DA format which can be reproduced by the ordinary CD player is recorded in the first session 9, and digital audio information sampled at the sampling frequency of 44.1 kHz and compressed by using the algorithm of ATRAC is recorded in the second session 10, information frame in which the point portion 112 of the first management area 2 is "B0" or "C0" and information frame in which the point portion 112 thereof is "E0" are provided, and information frame in which the point portion 112 of the second management area 5 is "D1" is provided, this invention is not limited to such embodiment. For example, other values may be recorded in the point portion 112 of the first management area 2 and the point portion 112 of the second management area 5 so that discrimination data are provided.

In addition, while, in the above-described embodiment, audio signals of the backward channels are compressed by using the algorithm of ATRAC in the second speech processing section 17, such audio signals may be compressed by using other compression algorithm without being limited to the above-mentioned compression method. Further, an approach may be employed, in place of compression, to carry out down-sampling so as to reduce the number of bits to carry out quantization so that data of the CD-ROM format is provided.

A second embodiment of the recording apparatus to which this invention is applied will now be described.

Figure 8:
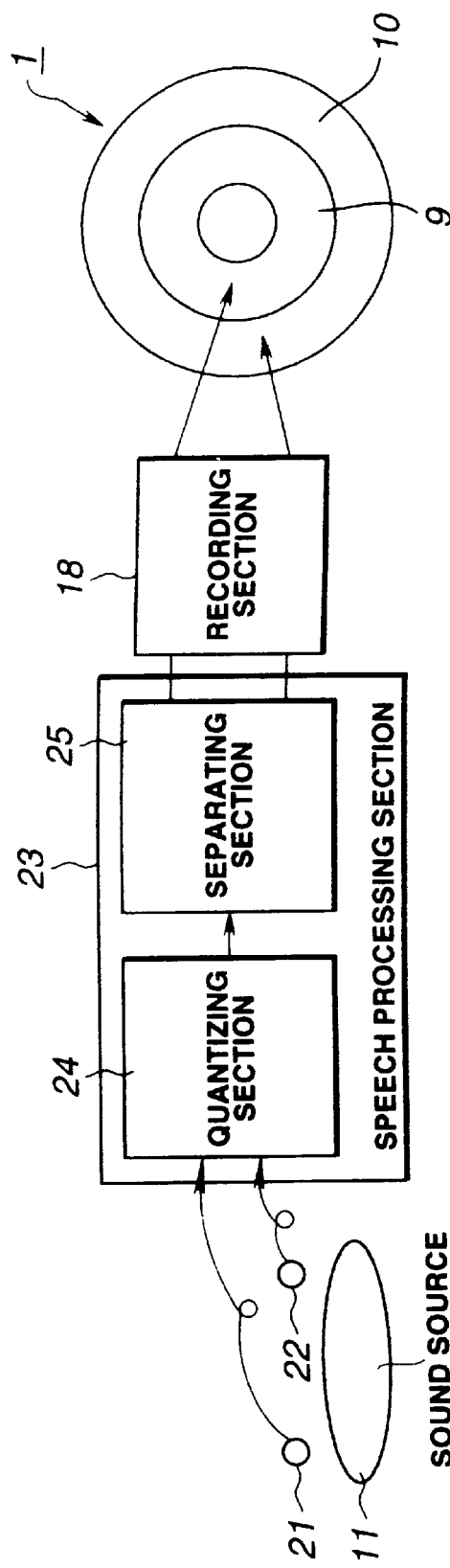
FIG. 8 is a block diagram showing the configuration of a second embodiment of the recording apparatus to which this invention is applied.

The recording apparatus of the second embodiment includes, as shown in FIG. 8, for example, as the speech processing section 23, a quantizing section 24 for sampling an audio signal from a sound source at a predetermined sampling frequency and for quantizing digital audio information thus obtained by a predetermined number of bits, and a separating section 25 for separating the digital audio information from the quantizing section 24 into digital audio information of high order bits and low order bits. In addition, the recording section 18 records the digital audio information of the high order bits into the first session 9 of the CD-R disc 1, and records the digital audio information of the low order bits into the second session 10 of the CD-R disc 1.

In more practical sense, audio signals from a first microphone 21 and a second microphone 22 are delivered to the quantizing section 24. The quantizing section 24 samples these audio signals, e.g., at the sampling frequency of 44.1 kHz prescribed (specified) by the CD-DA format thereafter to implement 20 bit linear quantization thereto. In this case, since the data size prescribed (specified) by the CD-DA format is 16 bits, the separating section 25 separates the audio signal which has been caused to undergo 20 bit quantization into data of high order 16 bits and data of low order 4 bits.

The recording section 18 records the data of the high order 16 bits separated at the separating section 25 into the first recording area 3 of the first session 9, and records the data of the low order 4 bits into the second management area 5 of the second session 10.

At this time, as described above, information frame in which the point portion 112 is defined as, e.g., "B0" or "C0" and information frame in which the point portion 112 is defined as "E0" are recorded in the first management area 2, and information frame in which the point portion 112 is defined as, e.g., "D2" is recorded in the second management area 5.

Meanwhile, in the conventional CD-DA format, since digital audio information quantized by the number of bits more than 16 bits or digital audio information having data size more than 16 bits cannot be directly recorded onto the disc, processing to reduce data size of such digital audio information is carried out to record the data thus processed onto the disc as data of the CD-DA format. To the contrary, in the recording apparatus to which this invention is applied, digital audio information having data size of, e.g., 20 bits is divided into information of the high order 4 bits and the low order 4 bits to record digital audio information having data size of 16 bits of the high order bit side into the first recording area 3 by the CD-DA format, and to record digital audio information of the remaining 4 bits of the low order bit side into the second recording area 6, thereby making it possible to record digital audio information of 20 bits of which number of bits has been increased onto the CD-R disc. In addition, it is possible to reproduce, from the CD-R disc recorded in this way, digital audio information recorded by the CD-DA format by using the ordinary CD player.

It is to be noted that explanation has been given in connection with the actual example (embodiment) in which, as discrimination data indicating CD-R disc such that digital audio information of which number of bits has been increased is separated into digital audio information of high order bits and low order bits to record respective digital audio information into the first recording area 3 and the second recording area 6, information unit in which the point portion 112 of the first management area 2 is "B0" or "C0" and information frame in which the point portion 112 is "E0" are provided, and information frame in which the point portion 112 of the second management area 5 is "D2" is provided, this invention is not limited to this embodiment. For example, other values may be recorded in the point portion 112 of the first management area 2 and the point portion 112 of the second management area 5 so that discrimination data are provided.

Moreover, while, in the above-described embodiment, as a method of separating digital audio information of which number of bits has been increased into high order bits and low order bits, the example of simply carrying out separation into high order 16 bits and low order 4 bits has been taken, this invention is not limited to such embodiment. For example, data of the higher order bit side may be caused to be data obtained on the basis of digital audio information of which number of bits has been increased, and data of the low order bit side may be caused to be data obtained on the basis of the remaining data.

Figure 9:
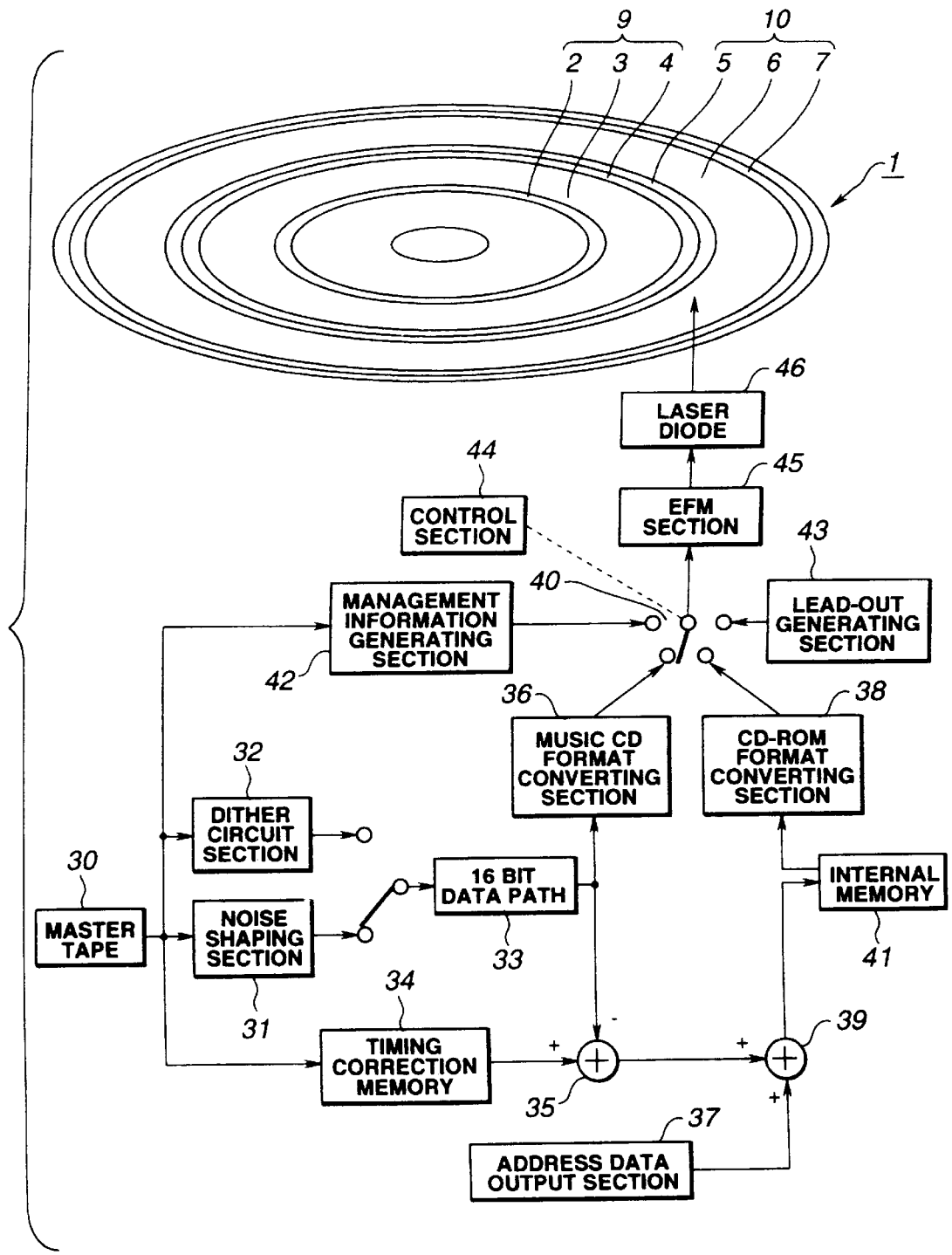
FIG. 9 is a block diagram showing the configuration of a first modified example of the recording apparatus.

The configuration of a modified example of the recording apparatus adapted for recording digital audio information of which number of bits has been increased in the state separated into high order bits and low order bits is shown in FIG. 9.

In the recording apparatus of this modified example, in place of output of the quantizing section 24, there is used digital audio information obtained by reproducing a master tape 30 on which there is recorded digital audio information quantized, e.g., by the number of bits more than 16 bits after undergone sampling at a sampling frequency of 44.1 kHz. Moreover, management information for carrying out management of recorded digital audio information is assumed to be written in above on the master tape 30.

Further, in this recording apparatus, data of high order bits, e.g., data of high order 16 bits to be recorded onto the CD-R disc 1 is assumed to be obtained by reducing the data size of the digital audio information from the master tape 30 to 16 bit data at a noise shaping section 31 or a dither circuit section 32, and data of the low order bits is caused to be difference between digital audio information from the master tape 30 and output from the noise shaping section 31 or the dither circuit section 32 at a difference calculating section 35.

Namely, the noise shaping section 31 carries out the so-called oversampling of digital audio information from the master tape 30 in view of the auditory sense characteristic to thereby shift the frequency characteristic of noise to the side of the higher frequency band where sensitivity is poor to lessen quantizing noise, and to allow digital audio information having the number of bits more than 16 bits to be digital audio information of 16 bits (hereinafter simply referred to as 16 bit data as the occasion may demand) by using the algorithm of the so-called sign bit mapping. Then, the noise shaping section 31 delivers the 16 bit data to a management information generating section 42, and delivers it to a music CD format converting section 36 and the difference calculating section 35 through a 16 bit data path 33.

On the other hand, the dither circuit section 32 adds random noise smaller than one quantization step a so-called dither to the digital audio information from the master tape 30 to convert data of the data size greater than 16 bits into 16 bit data. For example, in converting data quantized at the quantization level of 20 bits, i.e., 20 bit data into 16 bit data, since the step of one quantization level of 20 bits is smaller than one quantization step at the quantization level of 16 bits, data dispersed (distributed) between certain quantization steps of 16 bits are statistically dispersed (distributed) at quantization levels of 16 bits before and after to lessen quantizing noise. Then, the dither circuit section 32 delivers this 16 bit data to the management information generating section 42, and delivers it to the difference calculating section 35 and the music CD format converting section 36 through the 16 bit data path 33.

A timing correction memory 34 temporarily stores digital audio information having the number of bits more than 16 bits from the master tape 30, and delivers the stored digital audio information to the difference calculating section 35 in a manner synchronized with the timing at which corresponding data is delivered from the noise shaping section 31 or the dither circuit section 32 to the difference calculating section 35.

The difference calculating section 35 takes difference between 16 bit data from the noise shaping section 31 or the dither circuit section 32 and data of size more than 16 bits from the timing correction memory 34 to deliver difference data thus obtained to a mixing section 39.

The mixing section 39 mixes address data delivered from an address data output section 37 and difference data from the difference calculating section 35 to generate set of data, i.e., mixed data. It is to be noted that the address data indicates address on the CD-R disc 1 of 16 bit data corresponding to the difference data, and is used for reproducing the difference data and the 16 bit data in a manner synchronous with each other at reproducing apparatus which will be described later. Then, the mixed data is delivered to an internal memory 41, and is temporarily stored thereinto.

On the other hand, the music CD format converting section 36 converts 16 bit data into data prescribed (specified) by the CD-DA format to deliver music CD format data thus obtained to an EFM section 45 through a selector (changeover) switch 40.

Moreover, a CD-ROM format converting section 38 converts mixed data stored in the internal memory 41 into data prescribed (specified) by the CD-ROM format to deliver CD-ROM format data thus obtained to the EFM section 45 through the selector switch 40.

The management information generating section 42 includes register, and generates management data for forming management information to be recorded into the first management area 2 or the second management area 5 on the basis of the management information reproduced from the master tape 30 and output from the noise shaping section 31 or the dither circuit section 32 to temporarily stores it into the register. Moreover, the management information generating section 42 delivers the management data stored in the register to the EFM section 45 through the selector switch 40. As described later, after first management data to be recorded into the first management area 2 is outputted to the EFM section 45, second management data to be recorded into the second management area 5 is generated, and the second management data thus generated is stored into the register.

A lead-out generating section 43 generates lead-out data to be recorded into the first lead-out area 4 and the second lead-out area 7 to output it to the EFM section 45 through the selector switch 40.

The control section 44 controls switching operation of the selector switch 40. In this case, data recording onto the CD-R disc 1 is carried out in order from the inner circumferential side, i.e., in order of the first management area 2, the first recording area 3, the first lead-out area 4, the second management area 5, the second recording area 6 and the second lead-out area 7.

Accordingly, the control section 44 switches the selector switch 40 in accordance with the order recorded onto the CD-R disc 1 so that output of the management information generating section 42 is selected at the time of start of recording to deliver the first management data to the EFM section 45 to subsequently switch the selector switch 40 so that output of the music CD format converting section 36 is selected to deliver music CD format data to be recorded into the first recording area 3, which is sent on the real time basis, to the EFM section 45 to further switch the selector switch 40 so that output of the lead-out generating section 43 is selected to deliver first lead-out data to be recorded into the first lead-out area 4 to the EFM section 45. Further, the control section 44 sends out data to be recorded into the first session 9 to the EFM section 45 thereafter to carry out, also with respect to data to be recorded into the second session 10, a control for switching the selector switch 40 in order of the management information generating section 42, the CD-ROM format converting section 38 and the lead-out generating section 43 to deliver data thus obtained to the EFM section 45. In this example, the CD-ROM format converting section 38 is operative so that when its output is selected by the selector switch 40, it takes out data stored in the internal memory 41 to convert it into data of the CD-ROM format to output it.

The EFM section 45 modulates data delivered through the selector switch 40 from respective circuit components by the algorithm of EFM (Eight to Fourteen Modulation) which is the modulation system employed in the CD system to convert data inputted thereto into data in a form suitable for being written onto the CD-R disc 1 to output it to a laser diode 46.

The laser diode 46 is a recording light source for recording data outputted from the EFM section 45 onto the CD-R disc 1, and serves to emit recording laser beams in accordance with data from the EFM section 45 to irradiate these recording laser beams onto the recording surface provided on the surface of the CD-R disc 1 to carry out recording.

Figure 10:
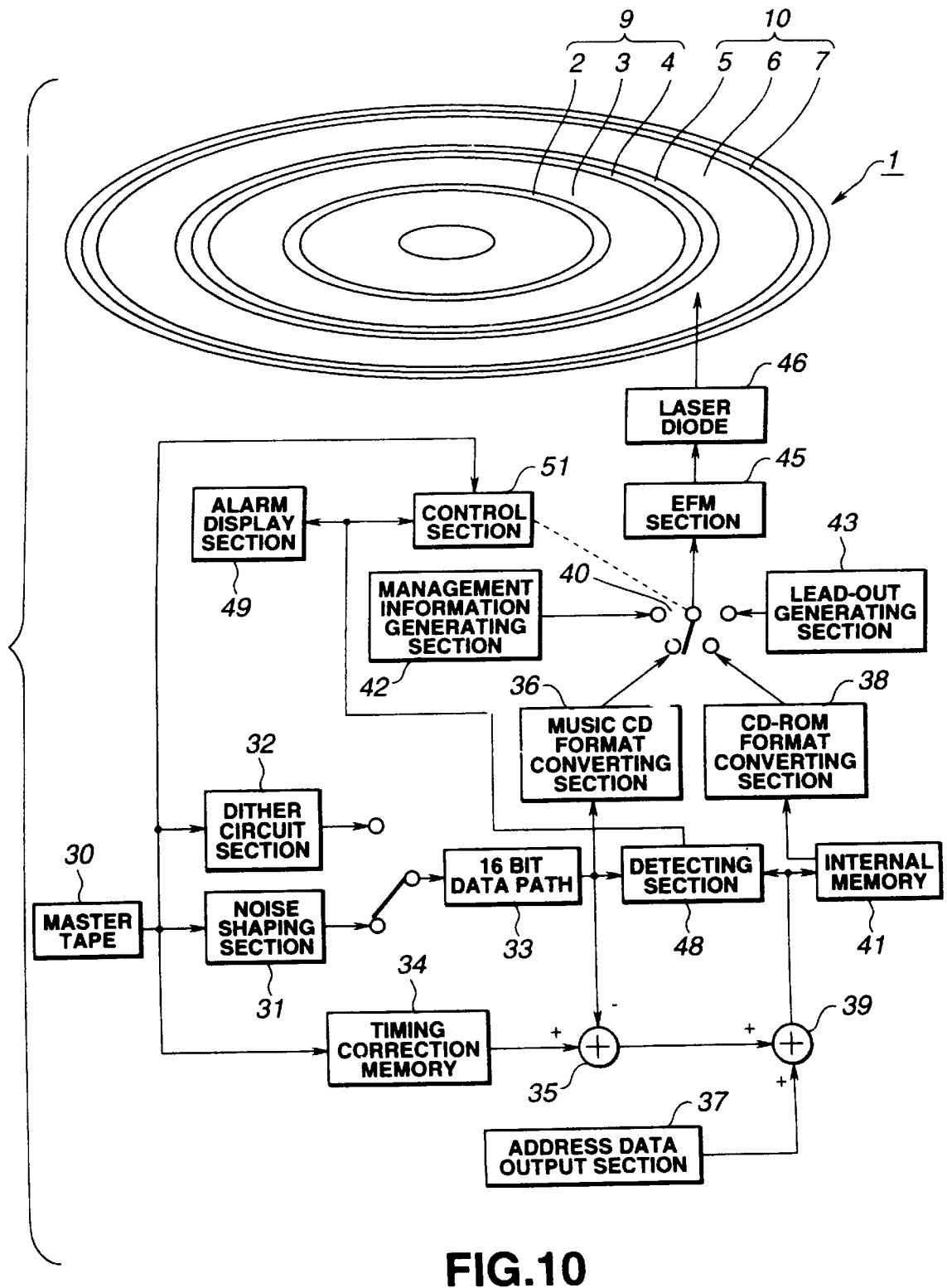
FIG. 10 is a block diagram showing the configuration of a second modified example of the recording apparatus.

It is to be noted that, as shown in FIG. 10, for example, a detecting section 48 may be further provided to detect, at this detecting section 48, respective data quantities of the music CD format data and the CD-ROM format data to discriminate on the basis of the detection result whether or not insufficiency takes place in the second recording area 6 into which CD-ROM format data will be written later to allow the control section 51 to be operative in accordance with the discrimination result.

Namely, the discrimination result is a signal generated in the case where when recording into the first recording area of the music CD format data is still more continued, the possibility that the second recording area 6 for recording the CD-ROM format data corresponding to the music CD format data may become insufficient takes place. This signal is delivered to the control section 51. Then, the control section 51 controls the selector switch 40 on the basis of this signal. In addition, the discrimination result is delivered to an alarm display section 49 to allow it to carry out display notifying compulsory end of recording of the first recording area.

Moreover, as shown in FIGS. 11A–11C, for example, there may be employed a configuration in which there are provided a time code output section 52 for outputting time code in order to link 16 bit data and difference data similarly to the address data, and a time code data converting section 53 for converting time code from the time code output section 52 into data for mixing it with difference data from the difference calculating section 35 to record data including time code information into the second recording area 6 of the CD-R disc 1.

Namely, in FIG. 11C, a music CD format converting section 55 converts 16 bit data delivered through the 16 bit data path 33 from the noise shaping section 31 or the dither circuit section 32 into music CD format data. Then, this music CD format data is caused to undergo EFM. The data thus obtained is recorded into respective areas of the first session 9 by using recording light source such as laser diode, etc.

On the other hand, a mixing section 54 mixes difference data from the difference calculating section 35, time code data from the time code data converting section 53, and address data from the address data output section 37 to deliver mixed data thus obtained to a CD-ROM format converting section 56. The CD-ROM format converting section 56 converts this mixed data into CD-ROM format data. The CD-ROM format data thus obtained is subjected to EFM. The data thus modulated is then recorded into respective areas of the second session 10 by using recording light source such as laser diode, etc.

Moreover, in the recording apparatus shown in FIG. 11C, recording into the first session 9 by the music CD format converting section 55 and recording into the second session 10 by the CD-ROM format converting section 56 are carried out by using recording heads independent respectively. Accordingly, the internal memory 41 provided in the recording apparatus shown in FIGS. 9 and 10 becomes unnecessary. In this recording apparatus mixed data outputted from the mixing section 54 is directly delivered to the CD-ROM format converting section 56.

It is to be noted that, also in the recording apparatus shown in FIGS. 9 and 10, the circuit section for outputting data relating to time code like the time code output section 52 of the recording apparatus shown in FIG. 11C may be provided to output time code data to the mixing section 54. In other words, in the recording apparatus shown in FIG. 11C, similarly to the recording apparatus shown in FIGS. 9 and 10, single recording head may be used to record time code, etc. into the second recording area 6.

A third embodiment of the recording apparatus to which this invention is applied will now be described.

Figure 12:
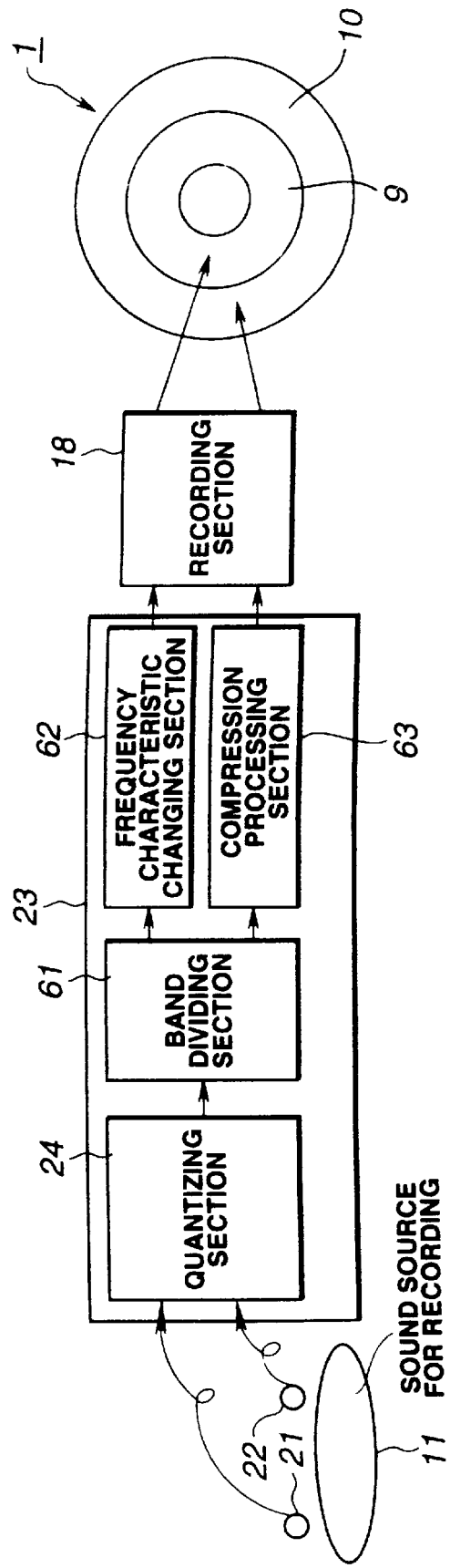
FIG. 12 is a block diagram showing the configuration of a third embodiment of the recording apparatus to which this invention is applied.

The recording apparatus of the third embodiment includes, as shown in FIG. 12, for example, quantizing section 24 for sampling an audio signal from a sound source for recording at a predetermined sampling frequency and for quantizing digital audio information thus obtained by a predetermined number of bits, and a (frequency) band dividing section 61 for band-dividing digital audio information from the quantizing section 24 at a frequency which is 1/n (n is integer) of the predetermined sampling frequency so that dividing into two groups is carried out. In this case, the recording section 18 records digital audio information of one group of two groups into the first session 9 of the CD-R disc 1, and records digital audio information of the other group into the second session 10 of the CD-R disc 1.

In more practical sense, audio signals from a first microphone 21 and a second microphone 22 are delivered to the quantizing section 24. The quantizing section 24 samples these audio signals at a sampling frequency, e.g., 88.2 kHz which is higher than the sampling frequency prescribed (specified) by, e.g., the CD-DA format thereafter to implement 20 bit linear quantization thereto. In this case, the data size prescribed (specified) by the CD-DA format is 16 bits sampled at a sampling frequency of 44.1 kHz. In addition, the valid (effective) signal component in the digital audio information sampled by a predetermined sampling frequency is the signal component at the lower frequency band side with respect to the frequency which is one half of the sampling frequency.

In view of the above, the band dividing section 61 is composed of, e.g., low-pass filter for allowing the signal component less than 22 kHz to be passed therethrough, and a band pass filter for allowing the signal component of the band of 22 kHz–44 kHz to be passed therethrough. The band dividing section 61 takes out, by the low-pass filter, the signal component less than 22 kHz of digital audio information sampled at the sampling frequency of 88.2 kHz to deliver this signal component to a frequency characteristic converting section 62, and takes the signal component of 22 kHz–44 kHz by the band pass filter to deliver this signal component to a compression processing section 63.

The frequency characteristic converting section 62 further samples the signal component of the band up to 22 kHz at the sampling frequency of 44.1 kHz to reduce the data size of 20 bits into 16 bits by using, e.g., the above-described algorithm of the sign bit mapping to deliver it to the recording section 18. In this way, data prescribed (specified) by the CD-DA format, i.e., data sampled at the sampling frequency of 44.1 kHz and quantized by 16 bits is obtained.

On the other hand, the compression processing section 63 compresses the signal component of the band of 22 kHz–44 kHz into data of data size of substantially ⅕ by using, e.g., the above-described algorithm of ATRAC to deliver it to the recording section 18.

The recording section 18 records data from the frequency characteristic converting section 62 into the first recording area 3 of the first session 9 of the CD-R disc 1 to convert the compressed data from the compression processing section 63 into data of the CD-ROM format to record it into the second recording area 6 of the second session 10 of the CD-R disc 1.

At this time, as described above, information frame in which the point portion 112 is defined as, e.g., "B0" or "C0" and information frame in which the point portion 112 is defined as "E0" are recorded into the first management area 2, and information frame in which, e.g., the point portion 112 is defined as "D3" is recorded into the second management area 5.

Meanwhile, in the case of the conventional CD-DA format, it was impossible to directly carry out recording of digital audio information sampled by a sampling frequency higher than 44.1 kHz. On the contrary, in the case of the recording apparatus to which this invention is applied, it is possible to prepare (produce) a CD-R disc where digital audio information of the CD-DA format of which number of bits has been reduced by down-sampling the signal component of the lower frequency band side of digital audio information sampled by a sampling frequency of, e.g., 88.2 kHz is recorded in the first recording area and digital audio information obtained by compressing the signal component of the higher frequency band side is recorded in the second recording area 6. In addition, it is possible to reproduce, from the CD-R disc thus recorded, digital audio information recorded by the CD-DA format by using the ordinary CD player.

Moreover, in the conventional CD-DA format, it was impossible to directly carry out recording of digital audio information quantized by the number of bits more than 16 bits or digital audio information having data size more than 16 bits. On the contrary, in the recording apparatus of the third embodiment, an approach is employed to divide, e.g., digital audio information having data size of 20 bits into digital audio information of the lower frequency band side and digital audio information of the higher frequency band side to reduce the number of bits of the digital audio information of the lower frequency band side by the sign bit mapping, etc., and to compress the digital audio information of the higher frequency band side, thereby making it possible to realize a recording medium which is capable of recording digital audio information of which number of bits has been increased, and is capable of reproducing digital audio information recorded by the CD-DA format by using the ordinary CD player similarly to the recording apparatus of the second embodiment.

It is to be noted that while explanation has been given in connection with the more practical example where, as discrimination data indicating CD-R disc in which digital audio information which has been caused to undergo the so called high-sampling where the sampling frequency is caused to be higher than 44.1 kHz is band-divided at a predetermined frequency, and data of the lower frequency band side thus obtained is recorded into the first recording area 3 after undergone down-sampling at a sampling frequency of 44.1 kHz and the data of the higher frequency band side is recorded into the second recording area 6 after undergone compression by using the algorithm of ATRAC, information frame in which the point portion 112 of the first management area 2 is "B0" or "C0", and information frame in which the point portion 112 is "E0" are provided, and information frame in which the point portion 112 of the second management area 5 is "D3" is provided. However, this invention is not limited to this actual example. For example, other values may be recorded into the point portion 112 of the first management area 2 and the point portion 112 of the second management area 5 so that discrimination data are provided.

In addition, while the signal component of the higher frequency band side is compressed by using the algorithm of ATRAC at the compression processing section 63 in the above-described embodiment, this invention is not such implementation. Any other compression algorithm may be used to carry out compression. Further, down-sampling may be carried out so as to reduce the number of bits in place of compression to carry out a quantization such that data of the CD-ROM format is provided.

A first embodiment of a reproducing apparatus to which this invention is applied will now be described.

Figure 13:
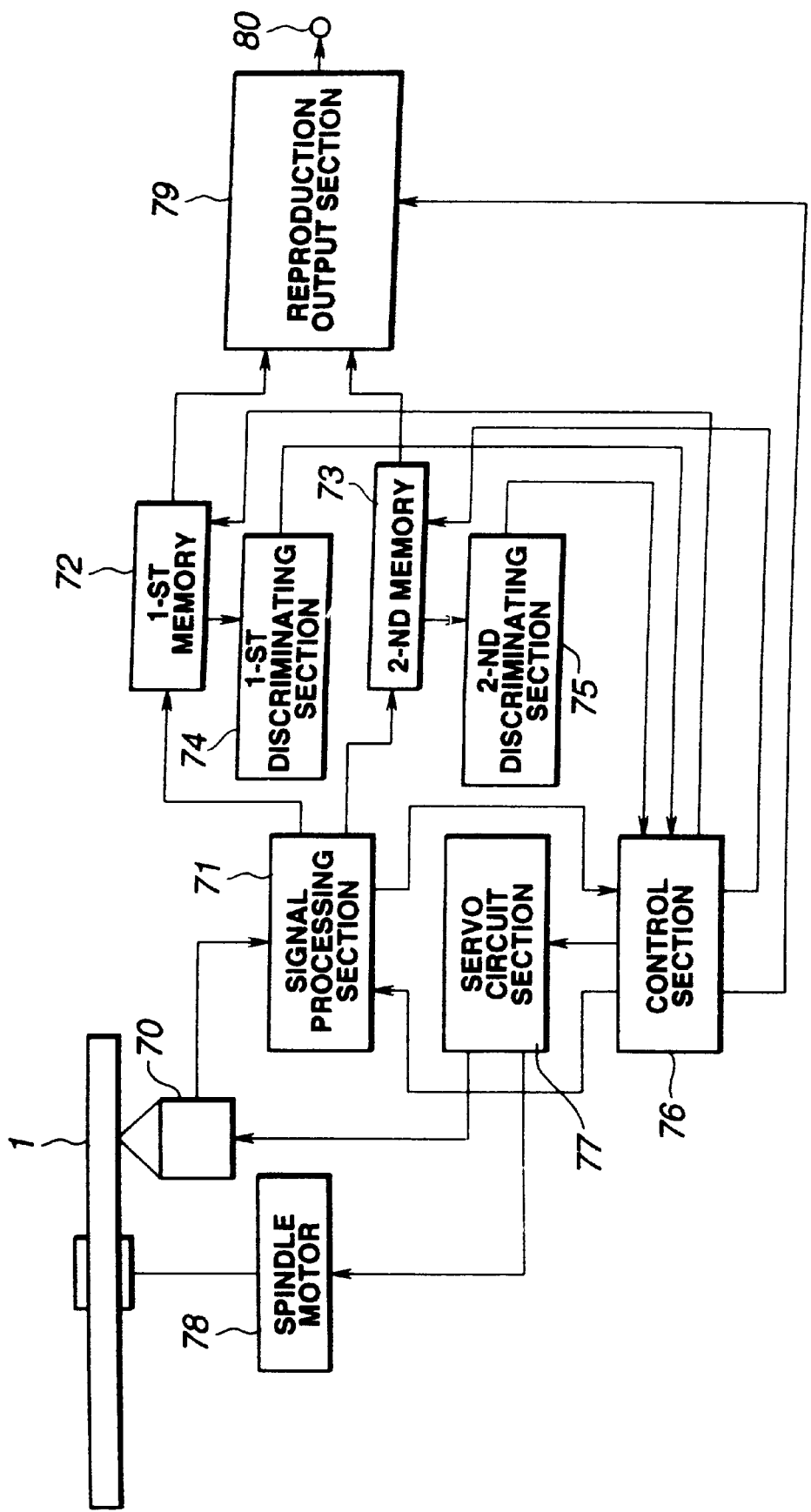
FIG. 13 is a block diagram showing the configuration of a first embodiment of a reproducing apparatus to which this invention is applied.

The reproducing apparatus of the first embodiment is directed to a reproducing apparatus adapted for reproducing digital audio information from CD-R disc 1 including, as shown in FIGS. 1A–1B, for example, first recording area 3 where digital audio information is recorded, first management area 2 where information for carrying out management of the digital audio information recorded in the first recording area is recorded, second recording area 6 where digital audio information corresponding to the digital audio information recorded in the first recording area 3 is recorded, and second management area 5 where information for carrying out management of the digital audio information recorded in the second recording area 6 is recorded, the apparatus comprising, as shown in FIG. 13, an optical pick-up 70 and a signal processing section 71 for reproducing digital audio information from the CD-R disc 1, a first memory 72 for storing the digital audio information which has been read from the first recording area 3 by the optical pick-up 70, a second memory 73 for storing the digital audio information which has been read from the second recording area 6 by the optical pick-up 70, a first discriminating section 74 for discriminating whether or not quantity of data stored in the first memory 72 is a predetermined quantity or more, a second discriminating section 75 for discriminating whether or not quantity of data stored in the second memory 73 is a predetermined quantity or more, a servo circuit section 77 for moving the optical pick-up 70, and a control section 76 for conducting a control to move the optical pick-up 70 to the second recording area 6 on the basis of information of the first management area 2 to store the digital audio information which has been read from the second recording area 6 into the memory 73, whereby in the case where it is discriminated at the second discriminating section 75 that quantity of data stored in the second memory 73 is the predetermined quantity or more, the control section 76 moves the optical pick-up 70 to the first recording area where digital audio information corresponding to the digital audio information stored in the second memory 73 is recorded to store the digital audio information which has been read from the first recording area 3 into the first memory 72 to output digital audio information from the first memory 72 and the second memory 73 while taking synchronization therebetween.

In this case, as described above, the CD-R disc 1 is an optical disc of the multisession (type) such that data of the CD-DA format is recorded in the first session 9 including the first management area 2 and the first recording area 3, and data of the CD-ROM format is recorded in the second session 10 including the second management area 5 and the second recording area 6.

In operation, the optical pick-up 70 reads out data from the CD-R disc 1 to deliver a reproduction signal thus obtained to the signal processing section 71. Moreover, the optical pick-up 70 provides access to the first recording area 3 or the second recording area 6 on the basis of a servo control signal from servo circuit section 77 which will be described later. In this case, the access time from the first session 9 to the second session 10 of the CD-R disc 1 and the access time of the optical pick-up 70 from the second session 10 to the first session 9 are, e.g., 1 second.

The signal processing section 71 extracts, from the reproduction signal, discrimination data indicating kind (type) of the CD-R disc 1 obtained from the first management area 2 or the second management area 5 to deliver it to the control section 76. Then, the control section 76 controls the signal processing section 71, etc. on the basis of the discrimination data. In more practical sense, the signal processing section 71 implements signal processing for the CD-DA format to a reproduction signal obtained by reading out the first session 9 under control of the control section 76 to deliver digital audio information thus obtained to the first memory 72, and implements a predetermined signal processing to a reproduction signal obtained by reading out the second session 10 to deliver digital audio information thus obtained to the second memory 73.

For example, in the case where the CD-R disc 1 recorded at the recording apparatus of the first embodiment is reproduced as described later, CD-R disc 1 to be reproduced is a disc including the second session 10, wherein data recorded in the second recording area 6 is data compressed by using the algorithm of ATRAC, and information frame in which the point portion 112 is "B0" or "C0" is recorded in the management area 2 and information frame in which the point portion 112 is "D1" is recorded in the second management area 5. When the signal processing section 71 detects these information frames, it delivers discrimination data for discriminating between the information frames to the control section 76. The control section 76 controls the signal processing section 71 by a control signal corresponding to the discrimination data, and the signal processing section 71 expands data corresponding to the second recording area 6 to deliver digital audio information thus obtained to the second memory 73.

The first memory 72 temporarily stores digital audio information corresponding to the first recording area 3 delivered from the signal processing section 71. Moreover, this first memory 72 delivers data indicating storage data quantity thus taken to the first discriminating section 74, and reads out the digital audio information stored therein on the basis of a memory control signal from the control section 76 to deliver it to a reproduction output section 79. Moreover, the second memory 73 temporarily stores digital audio information corresponding to the second recording area 6 from the signal processing section 71. Further, similarly to the first memory 72, the second memory 73 delivers data indicating storage data quantity thus taken to the second discriminating section 75, and reads out the digital audio information stored therein on the basis of a memory control signal from the control section 76 to deliver it to the reproduction output section 79.

Namely, the first discriminating section 74 discriminates on the basis of data indicating storage data quantity sent from the first memory 72 whether or not storage data quantity of the first memory 72 reaches a predetermined quantity, e.g., storage allowed quantity to deliver discrimination data indicating the discrimination result to the control section 76. Similarly, the second discriminating section 75 discriminates on the basis of data indicating storage data quantity sent from the second memory 73 whether or not storage data quantity of the second memory 73 reaches a predetermined quantity, e.g., storage allowed quantity to deliver discrimination data indicating the discrimination result to the control section 76. It is to be noted that while the first and second discriminating sections 74, 75 are provided independent of the first and second memories 72, 73 in this example, these sections may be provided within the respective memories 72, 73 or within the control section 76.

Explanation will be given with reference to the flowchart shown in FIG. 14, for example, in connection with the operation of the reproducing apparatus of the first embodiment, i.e., the reproducing method to which this invention is applied.

Figure 14:
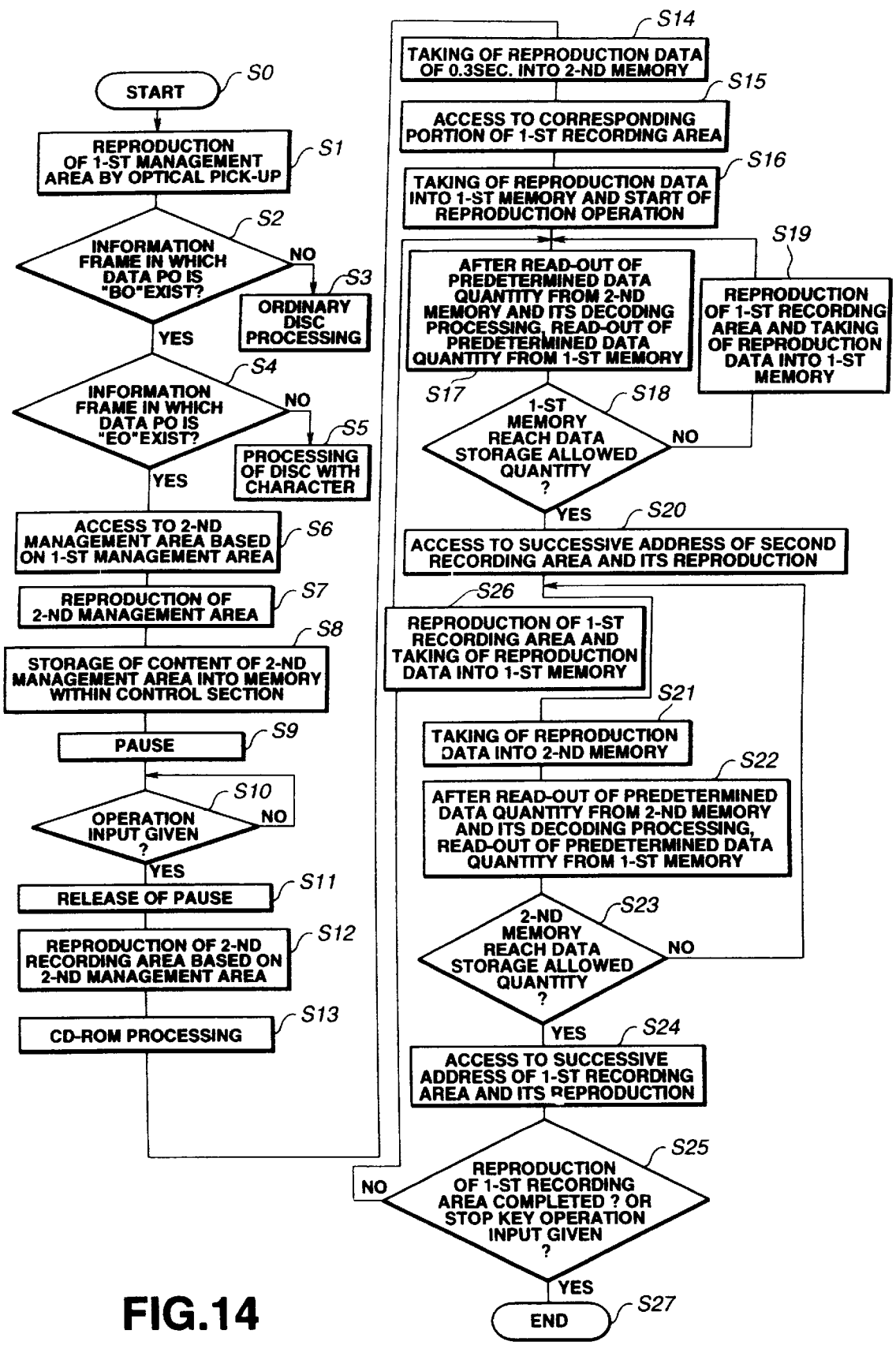
FIG. 14 is a flowchart for explaining a reproducing method to which this invention is applied, i.e., based on the reproducing apparatus of the first embodiment.

The reproducing method to which this invention is applied is a reproducing method for reproducing digital audio information from a recording medium including a first recording area 3 where digital audio information is recorded, a first management area 2 where information for carrying out management of the digital audio information recorded in the first recording area 3 is recorded, a second recording area 6 where digital audio information corresponding to the digital audio information recorded in the first recording area 3 is recorded, and a second management area 5 where information for carrying out management of the digital audio information recorded in the second recording area 6 is recorded, the method includes, as shown in FIG. 14, steps S1, S2 of reading information of -the first management area 2 to discriminate on the basis of the management information thus read whether or not the second recording area 6 exists, step S6 such that in the case where it is discriminated at the steps S1, S2 that the second recording area 6 exists, the optical pick-up 70 is caused to be moved to the second management area 5, steps S12, S13, S14 of reading information of the second management area 5 by the optical pick-up 70 which has been moved at the step S6 to read the digital audio information of the second recording area 6 on the basis of the information thus read to store the digital audio information which has been read into the first memory 72, step S15 of moving the optical pick-up 70 to the data recording position within the first recording area 3 where digital audio information corresponding to the digital audio information from the second recording area 6 stored in the first memory 72 at the steps S12 to S14 is recorded, and steps S16, S17 of reading out digital audio information of the first recording area 3 by the optical pick-up 70 moved at the step S15 to store the digital audio information thus read out to the second memory 73, and to output the digital audio information stored in the first memory 72 and the second memory 73 while taking synchronization therebetween.

Further, this reproducing method includes step S18 of comparing storage quantity of the second memory and a predetermined value, and step S20 such that in the case where it is discriminated at the step S18 that storage quantity of the second memory is the predetermined value or more, a procedure is taken to move the optical pick-up 70 to the data recording position within the second recording area 6 where digital audio information successive (continuous) to the digital audio information stored in the first memory 72 is recorded, and to read out the digital audio information, and steps S21, S22 of storing the digital audio information of the second recording area 6 which has been read at the step S20 into the first memory 72, and to output the digital audio information stored in the first memory 72 and the digital audio information stored in the second memory 73 while taking synchronization therebetween.

In this reproducing method, at step SO, reproduction operation of the CD-R disc 1 is started. At step S1, the optical pick-up 70 provides access to the first management area 2 to reproduce information. Namely, the control section 76 delivers a servo circuit control signal to the servo circuit section 77 to control the access operation of the optical pick-up 70.

At step S2, whether or not information frame in which data PO shown in FIG. 5 is "BO" exists within management information (hereinafter referred to as first management information) delivered from the optical pick-up 70 is discriminated at the control section 76. Namely, whether or not a disc being reproduced is a multi-session disc is discriminated. In the case where the discrimination result is NO, i.e., the disc being reproduced is the single session disc, the processing proceeds to step S3. Thus, the reproducing apparatus carries out reproduction processing of the ordinary disc.

On the other hand, in the case where the discrimination result at the step S2 is YES, i.e., the disc being reproduced is discriminated to be a multisession disc, the processing proceeds to step S4. Whether or not information frame in which data PO is "EO" exists within the first management information is discriminated in turn at the control section 76. When this discrimination result is NO, i.e., the disc being reproduced is discriminated to be a disc such that only character data is recorded in the second management area 5 of the second session 10, and no data is recorded in the second recording area 6, the processing proceeds to step S5. Thus, the reproducing apparatus carries out reproduction processing of the so-called disc with character.

Moreover, in the case where the discrimination result at the step S4 is YES, i.e., the disc being reproduced is discriminated to be a CD-R disc, the processing proceeds to step S6. Thus, the optical pick-up 70 provides access to the second management area 5 on the basis of address information indicated in the first management information. Namely, the control section 76 delivers a servo circuit control signal to the servo circuit section 77 to control the access operation of the optical pick-up 70. At step S7, the optical pick-up 70 carries out reproduction of the second management area 5. Then, the processing proceeds to step 58.

At the step S8, the control section 76 stores, into the internal memory, the data content of the second management area 5 (hereinafter referred to as second management information). Then, the processing proceeds to step S9. Thus, the reproducing apparatus is placed in the command input waiting state, and once becomes inoperative.

At step S10, when the control section 76 discriminates that there is command input, the processing proceeds to step S11. Thus, the control section 76 releases the temporary stop. Then, the processing proceeds to step S12.

At the step S12, the control section 76 delivers a servo circuit control signal to the servo circuit section 77 on the basis of address information of the second management information. The optical pick-up 70 provides access to the second recording area 6.

At step S13, the signal processing section 71 carries out scramble release processing for CD-ROM format of the second recording area 6 recorded by the standard of the CD-ROM and/or CD-ROM processing, e.g., error correction or address processing, etc. Namely, the control section 76 sends, to the signal processing section 71, a control signal for allowing it to carry out processing.

At step S14, the second memory 73 takes thereinto reproduction data obtained by the CD-ROM processing. Namely, the control section 76 delivers a processing control signal to the signal processing section 71 and delivers a memory control signal to the second memory 73.

At step S15, the optical pick-up 70 provides access to the first recording area 3 on the basis of address where digital audio information corresponding to the reproduction data taken into second memory 73 is recorded. Namely, the control section 76 delivers a servo circuit control signal to the servo circuit section 77 to control the access operation of the optical pick-up 70.

At step S16, the optical pick-up 70 reproduces reproduction data from the first recording area 3 accessed at the step S15 to output it. Further, the first memory 72 takes this reproduction data thereinto. Namely, the control section 76 delivers, to the signal processing section 71, a processing control signal for allowing it to carry out processing, and delivers a memory control signal to the first memory 72.

At step S17, the first memory 72 and the second memory 73 reads out digital audio information stored therein every predetermined data quantity to deliver them to the reproduction output section 79. The reproduction output section 79 mixes digital audio information delivered thereto to output it. Namely, the control section 76 delivers a memory control signal to the first memory 72 and the second memory 73, and delivers a reproduction control signal to the reproduction output section 79. It is to be noted that, also for this time period, reproduction data obtained by reproducing the first recording area is sent from the signal processing section to the first memory 72, and is stored thereinto.

At the step S18, the control section 76 discriminates whether or not the first memory 72 reaches a data storage allowed quantity. When this discrimination result is NO, i.e., it is discriminated that a space area exists in the first memory 72, the processing proceeds to step S19.

At the step S19, the optical pick-up 70 continues reproduction of the first recording area 3, and the first memory 72 stores reproduction data from the optical pick-up 70. Namely, the control section 76 delivers a servo circuit control signal to the servo circuit section 77 to control the access operation of the optical pick-up 70, delivers a processing control signal to the signal processing section 71, and delivers a memory control signal to the first memory 72. Then, the processing returns to the step S17.

On the other hand, when the discrimination result at the step S18 is YES, i.e., the control section 76 discriminates that the first memory 72 has reached the data storage allowed quantity, the processing proceeds to step S20.

At the step S20, the optical pick-up 70 provides access to successive address of the second recording area 6 to reproduce data. Namely, the control section 76 delivers a servo circuit control signal to the servo circuit section 77 to control the access operation of the optical pick-up 70.

At step S21, the second memory 73 takes thereinto reproduction data of the second recording area 6 reproduced by the optical pick-up 70 at the step S20. Namely, the control section 76 delivers a processing control signal to the signal processing section 71 and delivers a memory control signal to the second memory 73.

At step S22, the first memory 72 and the second memory 73 read out stored digital audio information every predetermined data quantity to deliver them to the reproduction output section 79. The reproduction output section 79 mixes the digital audio information delivered thereto to output it. Then, the control section 76 delivers a memory control signal to the first memory 72 and the second memory 73, and delivers a reproduction control signal to the reproduction output section 79. It is to be noted that, also for this time period, reproduction data obtained by reproducing the second recording area 6 is sent from the signal processing section 71 to the second memory 73, and is stored thereinto.

At step S23, the control section 76 discriminates whether or not the second memory 73 reaches the data storage allowed quantity. When this discrimination result is NO, i.e., it is discriminated that any space area exists in the second memory 73, the processing returns to the step S21. In contrast, when the discrimination result is YES, :i.e., it is discriminated that the memory 73 has reached the data storage allowed quantity, the processing proceeds to step S24.

At the step S24, the optical pick-up 70 provides access to successive address of the first recording area 3 to reproduce data. Namely, the control section 76 delivers a servo circuit control signal to the servo circuit section 77 to control the access operation of the optical pick-up 70.

At step S25, the discriminating section 76 discriminates whether or not reproduction of the first recording area 3 is completed, or whether or not command input for stop operation is given. When this discrimination result is NO, i.e., it is discriminated that digital audio information which has not been yet reproduced exists in the first recording area 3, and it is discriminated that there is no command input for stop operation, the processing proceeds to step S26.

At the step S26, the optical pick-up 70 continues reproduction of the first recording area 3, and the first memory 72 stores reproduction data from the optical pick-up 70. Namely, the control section 76 delivers a servo circuit control signal to the servo circuit section 77 to control the access operation of the optical pick-up 70, delivers a processing control signal to the signal processing section 71, and delivers a memory control signal to the first memory 72. Then, the processing returns to the step S17.

On the other hand, in the case where discrimination result is YES, i.e., it is discriminated that reproduction of the digital audio information of the first recording area 3 is completed, or command input for stop operation is given, the processing proceeds to step S27. Thus, this reproducing apparatus completes the reproducing operation.

It is to be noted that in the case where in the case of CD-R disc in which time code is added in the second recording area 6 by the CD-ROM format, at the step S17 and the step S22, even if an approach is not employed to take out reproduction data from the first memory 72 and reproduction data from the second memory 73 by allowing timings to be in correspondence with each other, data of the first memory 72 and the second memory 73 are read out at the same time (in parallel), thereby making it possible to output digital audio information in a manner caused to be synchronous with each other.

In a reproducing method as shown in FIG. 14, in order to temporarily take data which has been read into the memory to output data from the memory, it is the necessary condition that the data write speed in writing data into the memory is more than the data read speed.

In view of the above, it is necessary that the speed for writing digital audio information into the first memory 72 is higher than the speed for reading out digital audio information from the first memory, and the speed for writing digital-audio information into the second memory 73 is higher than the speed for reading out digital audio information from the second memory.

Explanation will be given in connection with the write speed and the read speed with respect to the first memory 72 and the write speed and read speed with respect to the second memory 73 by taking the example of a reproducing method for reproducing CD-R disc where CD-DA format data is recorded in the first recording area 3 and compressed data compressed by using the algorithm of ATRAC is recorded in the second recording area 6.

The data read speed (rate) at the time of reproduction prescribed in the ordinary CD system is 1.4112 M bits/sec. Moreover, since compressed data compressed by using the algorithm of ATRAC as described above is compressed into data of data size of substantially ⅕, the read speed of compressed data from the second memory 73 is 0.2822 (=1.4112×(⅕)) M bits/sec.

In order to satisfy the condition as described above, since the data read speed from the first memory 72 for taking thereinto digital audio information of the first recording area 3 at the time of reproduction is 1.4112 (M bits/sec.), it is necessary that the data write speed into (with respect to) the first memory 72 is 1.4112 (M bits/sec.) or more. Moreover, since the data read speed from the second memory 73 for taking thereinto digital audio information of the second recording area 6 in carrying out reproduction in a manner synchronized with digital audio information of the first recording area 3 is 282. 2 (=1.4112 (M bits/sec.)×(⅕) K bits/sec., it is necessary that the data write speed into (with respect to) the second memory 73 is 282.2 K bits/sec. or more.

Explanation will be given on the premise that the data write speed into (with respect to) the first memory 72 (hereinafter referred to as first write speed as the occasion may demand) is caused to be value four times greater (higher) than the data read speed from the first memory 72 (hereinafter referred to as first read speed as the occasion may demand), i.e., 5.6448 (M bits/sec.), and the write speed into (with respect to) the second memory (hereinafter referred to as second write speed as the occasion may demand) is caused to be value 20 times greater (higher) than the data read speed from the second memory 73 (hereinafter referred to as second read speed as the occasion may demand), i.e., 5.6448 (M bits/sec.).

Figure 15A:
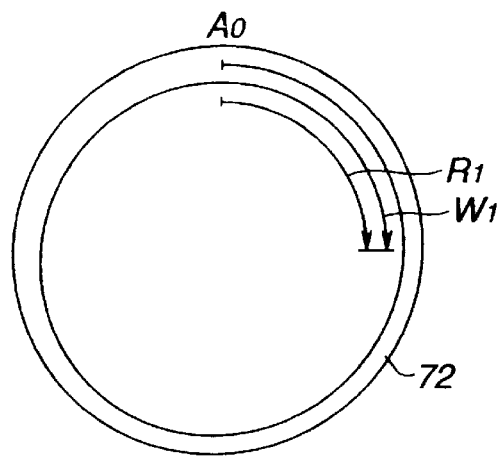
FIGS. 15A and 15B are views for explaining the operation of memory of the reproducing apparatus.
Figure 15B:
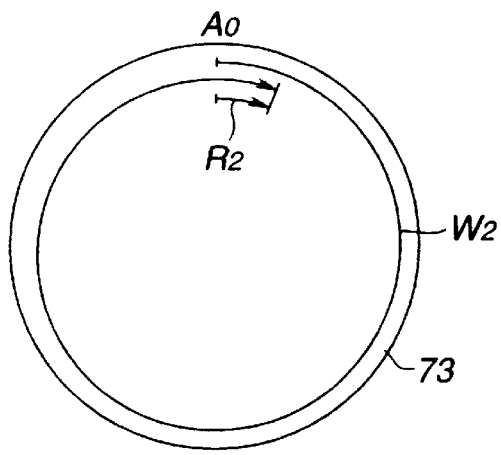

The first memory 72 stores data in order from address $A_0$, as shown in FIG. 15A, for example, to repeat such storage operation at a certain period. The second memory 73 stores data in order from address $A_0$ similarly to the first memory 72, as shown in FIG. 15B, for example, to repeat such storage operation at a certain frequency. It is to be noted that storage allowed quantities of data of the first memory 72 and the second memory 73 are respectively caused (assumed) to be 16.38 M bits.

Moreover, write vector $W_1$ is defined as vector indicating direction and address in writing data into the first memory 72 in order from $A_0$. Further, read vector $R_1$ is defined as vector indicating direction and address in reading data in order from address $A_0$ of the first memory 72. Furthermore, also with respect to the second memory 73, write vector $W_2$ and read vector $R_2$ are similarly defined. In addition, when capacity of the memory is m, data write speed into the memory is w and data read speed from the memory is r (w>r), the time T required until the memory reaches the data storage allowed quantity is generally expressed by the following formula (1).

$$T=m/(w-r) \qquad (1)$$

In accordance with the above formula (1), the time $T_1$ required until the first memory 72 reaches the data storage allowed quantity is 3.8690 (=16.38/(5.6448−1.4112) sec., i.e., approximately 3.9 sec. On the other hand, the time $T_2$ required until the second memory 73 reaches the data storage allowed quantity is 3.0545 (=16.38/(5.6448−0.2822)) sec., i.e., approximately 3.1 sec.

Moreover, since the first write speed is the value four times greater (higher) than the first read speed, and the second write speed is the value 20 times greater (higher) than the second read speed, movement (advancing) speed of the write vector $W_1$ becomes equal to value four times greater than the movement (advancing) speed of the read vector $R_1$, and the movement speed of the write vector $W_2$ becomes equal to value 20 times greater than the movement speed of the read vector $R_2$.

Figure 16:
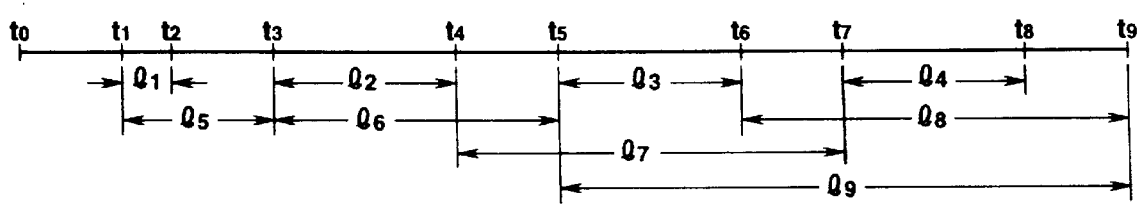
FIG. 16 is a time chart showing data write/data read timings with respect to two memories.

The timing for taking out digital audio information from respective recording areas to reproduce them is shown in a model form in the time chart of FIG. 16.

In this time chart, after reproduction starts and the control section 76 of the reproducing apparatus shown in FIG. 13 takes thereinto data of the first management area 2 and data of the second management area 5, the optical pick-up 70 provides access to the second recording area 6 from the first recording area 3 on the basis of the data of the second management area 5 for the time period from the time $t_0$ the time $t_1$.

For the time period 11 from the time $t_1$ to the time $t_2$, the reproduction data from the second recording area 6 is written into the second memory 73. For the time period from the time $t_2$ to the time $t_3$, the optical pick-up 70 provides access to the first recording area 3 from the second recording area 6.

Moreover, for the time period 12 from the time $t_3$ to the time $t_4$, reproduction data from the first recording area 3 is written into the first memory 72. For the time period from the time $t_4$ to the time $t_5$, the optical pick-up 70 provides access to the second recording area 6 from the first recording area 3.

For the time period $l_3$ from the time $t_5$ to the time $t_6$, reproduction data from the second recording area 6 is written into the second memory 73. For the time period from the time $t_6$ to the time $t_7$, the optical pick-up 70 provides access to the first recording area 3 from the second recording area 6.

Moreover, for the time period $l_4$ from the time $t_7$ to the time $t_8$, reproduction data from the first recording area 3 is written into the first memory 72. For the time period from the time $t_8$ to the time $t_9$, the optical pick-up 70 provides access to the second recording area 6 from the first recording area 3.

In this example, it is assumed that the reproduction operation starts at the time $t_1$ and reproduction data is actually outputted at the time $t_3$.

Further, the access time between the first recording area 3 and the second recording area 6 is 1 sec. as described above.

Furthermore, the time period $l_1$, is, e.g., 0.3 sec., and data is taken into the second memory 73 from the second recording area 6 for this time period $l_1$. In addition, since the write vector $W_2$ has speed 20 times greater than that of the read vector $R_2$, at reproduction data of 6 (=0.3×20) sec. is taken into the second memory 73. Namely, for 6 sec. from the time $t_2$, there is no necessity of taking data into the second memory 73 from the second recording area 6.

The time period $l_2$ starts after the time period $l_5$, i.e., 1.3 (=0.3+1) sec. Moreover, as described above, the time $T_1$ required until the first memory 72 reaches the data storage allowed quantity is 3.9 sec. For this time period $l_2$, data is taken into the first memory 72 from the first recording area 3. Further, since the write vector $W_1$ has speed four times greater than that of the read vector $R_1$, reproduction data of 15.6–(=3.9×4) sec. is taken into the first memory 72. At this time, since output of reproduction data from the first memory 72 starts from the starting time of the time period $l_1$ as described above, reproduction data of 11.7 (=15.6–3.9) sec. remains in the first memory 72 at the time when data has been taken in, i.e., at the time $t_4$.

The time period $l_3$ starts after the time period $l_6$ from the time $t_3$, i.e., 4.9 (=3.9+1) sec. Moreover, the time $T_2$ required until the second memory 73 reaches the data storage allowed quantity is 3.1 sec. as described above. For this time period $l_3$, data is taken into the second memory 73 from the second recording area 6. In this case, the time $t_5$ when taking of data into the second memory 73 is started for a second time is passed by 5.9 (=1+4.9) sec. obtained by adding 1 sec. and the time period $l_6$, i.e., 4.9 (=3.9+1) sec from the time $t_2$ when taking of data into the second memory 73 has been previously stopped. Since this elapsed time is less than the above-described 6 sec., there is no possibility that the second memory 73 may become empty for this time period $l_6$. It is to be noted that reproduction data of 62 (=3.1×20) sec. has been taken into the second memory 73 for the time period $l_3$, but since the data read-out operation is continued, reproduction data of 58.9 (=62–3.1) sec. remains in the second memory 73 at the time when taking-in of data has been completed, i.e., at the time $t_6$.

Moreover, for the time period $l_4$, such an operation to once take data for 3.9 sec. from the first recording area 3 into the first memory 72, and to twice output data for 15.6 sec. from the first memory 72 is carried out. Namely, the time period $l_4$ is 35.1 (=15.6+15.6+3.9) sec. In this case, the time $t_4$ when taking of data into the first memory 72 is started for a second time is passed by the time period $l_7$, i.e., 5.1 (=1+3.1+1) sec. from the time $t_4$ when taking of data into the first memory 72 has been previously stopped. However, since this elapsed time is less than the above-described 11.7 sec., there is no possibility that the first memory 72 may become empty at this time period $l_7$. In this example, reproduction data of 11.7 sec. is taken into the first memory 72 from the time when the time period $l_7$ is completed, i.e., the time $t_8$.

Further, taking of data into the second memory 73 is started from the time $t_9$. In this case, since this time $t_9$ is passed by the time period $l_8$, i.e., 37.1 (=1+35.1+1) sec. from the time when taking of data into the second memory 73 has been previously stopped, i.e., the time $t_6$, but this elapsed time is less than the above-described 58.9 sec., there is no possibility that the second memory 73 may become empty for this time period $l_8$.

In a manner as described above, the operation of the time period $l_9$ from the time $t_5$ to the time $t_9$ is continued, thereby making it possible to reproduce data from the first recording area 3 and the second recording area 6 in the state where sound (speech) is not interrupted to output them in the state where synchronization is established. Namely, the time period $l_9$ is 40.2 (=3.1+1+35.1+1) sec.

It is to be noted that while explanation has been given by taking, as the disc to be reproduced, the example of the CD-R disc including plural recording areas, and such that data of the CD-DA format standard is recorded in the first recording area 3, and data of the CD-ROM format standard is recorded into the second recording area 6, wherein data compressed by using the algorithm of ATRAC is recorded as the data of the CD-ROM format standard, disc in other form as described later may be used.

Further, while the speed for writing data taken from the disc into the memory is set to a value four times greater (higher) than the speed for taking out data from the memory, this invention is not limited to such examples, but higher speed may be employed within the realizable range. In addition, while capacity of the memory is set to 16 M bits, this invention is not limited to such an example also in this case, but memory having arbitrary capacity may be used. It is to be noted that if these values are changed, it is a matter of course that lengths of respective time periods $l_1$ to $l_9$ shown in FIG. 16 would vary.

For example, according as the capacity of a memory used becomes larger, lengths of respective time periods may be set to longer values.

Other circuit sections of the reproducing apparatus shown in FIG. 13 will now be described.

The servo circuit section 77 delivers, to the optical pick-up 70, a focus servo control signal, a tracking servo control signal and a sled servo control signal in accordance with a servo circuit control signal as described above, which is delivered from the control section 76, to carry out servo control of the optical pick-up 70. Moreover, the servo circuit section 77 delivers a rotation servo control signal to a spindle motor 78 to carry out control of rotation of the spindle motor 78.

It is essentially required that the spindle motor 78 rotates at a speed higher than that of the spindle motor of the ordinary CD player. In order that the speed for writing reproduction data into the memory which takes thereinto data from the recording medium is caused to be value four times higher than the speed for reading out reproduction data from the memory, rotation speed of the spindle motor 78 is set to a value four times higher than the rotation speed of the spindle motor of the ordinary CD player. In addition, the spindle motor 78 may be caused to rotate at a higher speed. By allowing the spindle motor 78 to rotate at a speed higher than that of the spindle motor of the ordinary CD player, reproduction of digital audio information from the CD-R disc 1 can be carried out by the above-described reproducing method.

The reproduction output section 79 comprises synthesis section, digital/analog converter, and audio amplifier, etc. More particularly, the synthesis section synthesize, on the basis of reproduction control signal from the control section 76, digital audio-information from the first memory 72 and digital audio information from the second memory 73 while taking synchronization therebetween. The digital/analog converter converts the synthesized digital audio information into analog audio signal. The audio amplifier amplifiers this audio signal to output it through an output terminal 80.

A modified example of the first embodiment of the reproducing apparatus to which this invention is applied will now be described.

In this reproducing apparatus, digital audio information recorded in the first recording area 3 of the first session 9 of the CD-R disc 1 is digital audio information of 2 channels, e.g., forward channels, and digital audio information recorded in the second recording area 6 of the second session 10 is digital audio information of 2 channels, e.g., backward channels corresponding to the digital audio information recorded in the first recording area 3. This reproducing apparatus is adapted to reproduce digital audio information from the CD-R disc 1. In addition, digital audio information recorded in the second recording area 6 is digital audio information compressed, e.g., by the algorithm of ATRAC.

Figure 17:
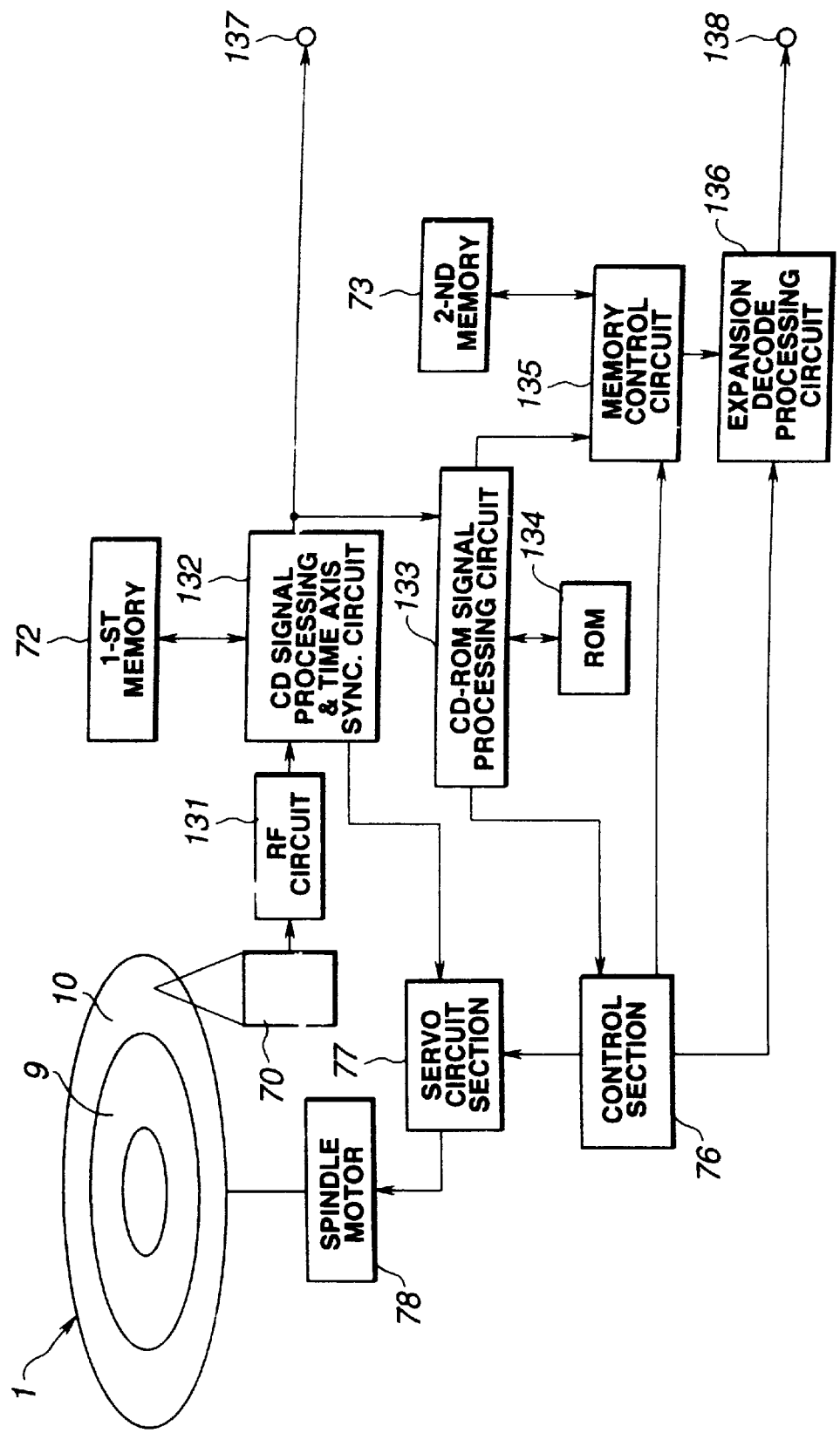
FIG. 17 is a block diagram showing the configuration of a first modified example of the reproducing apparatus to which this invention is applied.

In the reproducing apparatus of this modified example, as shown in FIG. 17, for example, the optical pick-up 70 provides access to the CD-R disc 1 by the focus servo control signal, the tracking servo control signal and the sled servo control signal from the servo circuit section 77. Then, data of the CD-R disc 1 is read by the optical pick-up 70. The data thus obtained is delivered to a RF circuit 131 as a RF signal, and is delivered to a CD signal processing and time axis synchronization (sync.) circuit 132 after undergone waveform shaping and binarization.

The CD signal processing and time axis synchronization circuit 132 is operative so that when management information recorded in the first management area 2 and the second management area 5 of data from the RF circuit 131 are inputted thereto, it delivers those management information to the control section 76. Moreover, the CD signal processing and time axis synchronization circuit 132 is operative so that when program data (digital audio information) recorded in the first recording area 3 and the second recording area 6 are inputted thereto, it carries out CD signal processing, i.e., demodulates EFM data of the CD-DA format to deliver reproduction data thus obtained to the first memory 72.

On the other hand, the CD signal processing and time axis synchronization circuit 132 is operative so that when data of the CD-ROM format is inputted thereto, it demodulates EFM data of the CD-ROM format to deliver data thus obtained to a CD-ROM signal processing circuit 133.

Moreover, the CD signal processing and time axis synchronization circuit 132 reads out reproduction data from the first memory 72 on the basis of the processing control signal and the memory control signal from the control section 76 to output it through a forward channel output terminal 137.

The first memory 72 has, e.g., capacity of 16 M bits, and serves to temporarily stores reproduction data corresponding to the data recorded in the first recording area 3.

Then, the CD-ROM signal processing circuit 133 carries out error correction of data of the CD-ROM format from the CD signal processing and time axis synchronization circuit 132 by using the error correction code for the CD-ROM format, or detects address information, etc. Then, the CD-ROM signal processing circuit 133 delivers reproduction data thus obtained to the second memory 73 and delivers address information to the control section 76 through a memory control circuit 135. Namely, a ROM 134 connected to the CD-ROM signal processing circuit 133 has, e.g., capacity of 64 K bits, and data and/or program for error correction or detection of address information are stored in this ROM 134. Then, the CD-ROM signal processing circuit 133 carries out error correction and/or address detection in accordance with such data and/or program.

The memory control circuit 135 delivers reproduction data delivered from CD-ROM signal processing circuit 133, i.e., reproduction data obtained from the second recording area 6 to the second memory 73. Moreover, the memory control circuit 135 reads out reproduction data from the second memory 73 in accordance with a memory control signal from the control section 76 to deliver it to an expansion decode processing circuit 136. The second memory 73 has, e.g., capacity of 16 M bits similarly to the first memory 72, and serves to temporarily store reproduction data corresponding to the data recorded in the second recording area 6.

The expansion decode processing circuit 136 decodes reproduction data which has been read out from the second memory 73, i.e., data compressed into data size of substantially ⅕ by using the algorithm of ATRAC to output reproduction data thus obtained through a backward channel output terminal 138.

The control section 76 generates a servo circuit control signal for controlling the access operation with respect to the CD-R disc 1 of the optical pick-up 70 on the basis of the management information and the reproduction data delivered from the CD signal processing and time axis synchronization circuit 132 to deliver this servo circuit control signal to the servo circuit section 77, and generates a processing control signal for controlling data processing at the CD signal processing and time axis synchronization circuit 132 and the CD-ROM signal processing circuit 133 to deliver it to the CD-ROM signal processing circuit 133. Moreover, the control section 76 generates a memory control signal for taking out reproduction data from the first memory 72 to deliver it to the CD-ROM signal processing circuit 133 through the CD signal processing and time axis synchronization circuit 132, and delivers a memory control signal for taking out reproduction data from the second memory 73 to the memory control circuit 135. Further, the control section 76 generates a decode control signal for controlling decode operation at the expansion decode processing circuit 136 on the basis of the CD-ROM format data from the CD-ROM signal processing circuit 133 to deliver it to the expansion decode processing circuit 136.

The servo circuit section 77 generates a focus servo control signal, a tracking servo control signal and a sled servo control signal on the basis of a servo circuit control signal delivered from the control section 76 to control the access operation with respect to the CD-R disc 1 of the optical pick-up 70. In addition, the servo circuit section 77 generates a rotation servo control signal for controlling rotation operation of the spindle motor 78 to deliver it to the spindle motor 78.

As described above, the spindle motor 78 has a rotation speed higher than that of the spindle motor of the ordinary CD player, and rotates, e.g., at a speed four times higher than that of the spindle motor of the ordinary CD player.

Further, in this reproducing apparatus, in the case where CD-R disc 1 such that digital audio information of the forward channels are recorded in the first recording area 3 and digital audio information of the backward channels are recorded in the second recording area 6 is reproduced, data of the respective recording areas are read by the optical pick-up 70. At this time, data from the first recording area 3 is processed at the CD signal and time axis synchronization circuit 132, and is temporarily stored into the first memory 72. Moreover, data from the second recording area 6 is caused to undergo demodulation processing corresponding to EFM at the CD signal processing and time axis synchronization circuit 132, and is then temporarily stored into the second memory 73 through the memory control circuit 135.

The control section 76 takes out reproduction data taken into the first memory 72 and reproduction data taken into the second memory 73 on the basis of the memory control signal in such a manner that they are synchronized with each other to output the reproduction data from the first memory 72 through the forward channel output terminal 137, and to decode the reproduction data from the second memory 73 at the expansion decode processing circuit 136 thereafter to output it through the backward channel output terminal 138.

Another modified example of the first embodiment of the reproducing apparatus will now be described.

In this reproducing apparatus, digital audio information recorded in the first recording area of the first session 9 of the CD-R disc 1 is digital audio information obtained by sampling an audio signal at a predetermined frequency, e.g., 88.2 kHz thereafter to quantize it by a predetermined number of bits, e.g., 16 bits to band-divide the quantized digital audio information at a predetermined frequency, e.g., 22 kHz to sample, e.g., the digital audio information of the group of the lower frequency band side of 0 kHz~22 kHz at a sampling frequency lower than the predetermined sampling frequency, e.g., 44.1 kHz; and digital audio information recorded in the second recording area 6 of the second session 10 is digital audio information obtained by compressing the digital audio information of the group of the higher frequency band side of 22 kHz~44 kHz, e.g., by the algorithm of ATRAC. This reproducing apparatus is adapted to reproduce digital audio information from the CD-R disc 1.

Figure 18:
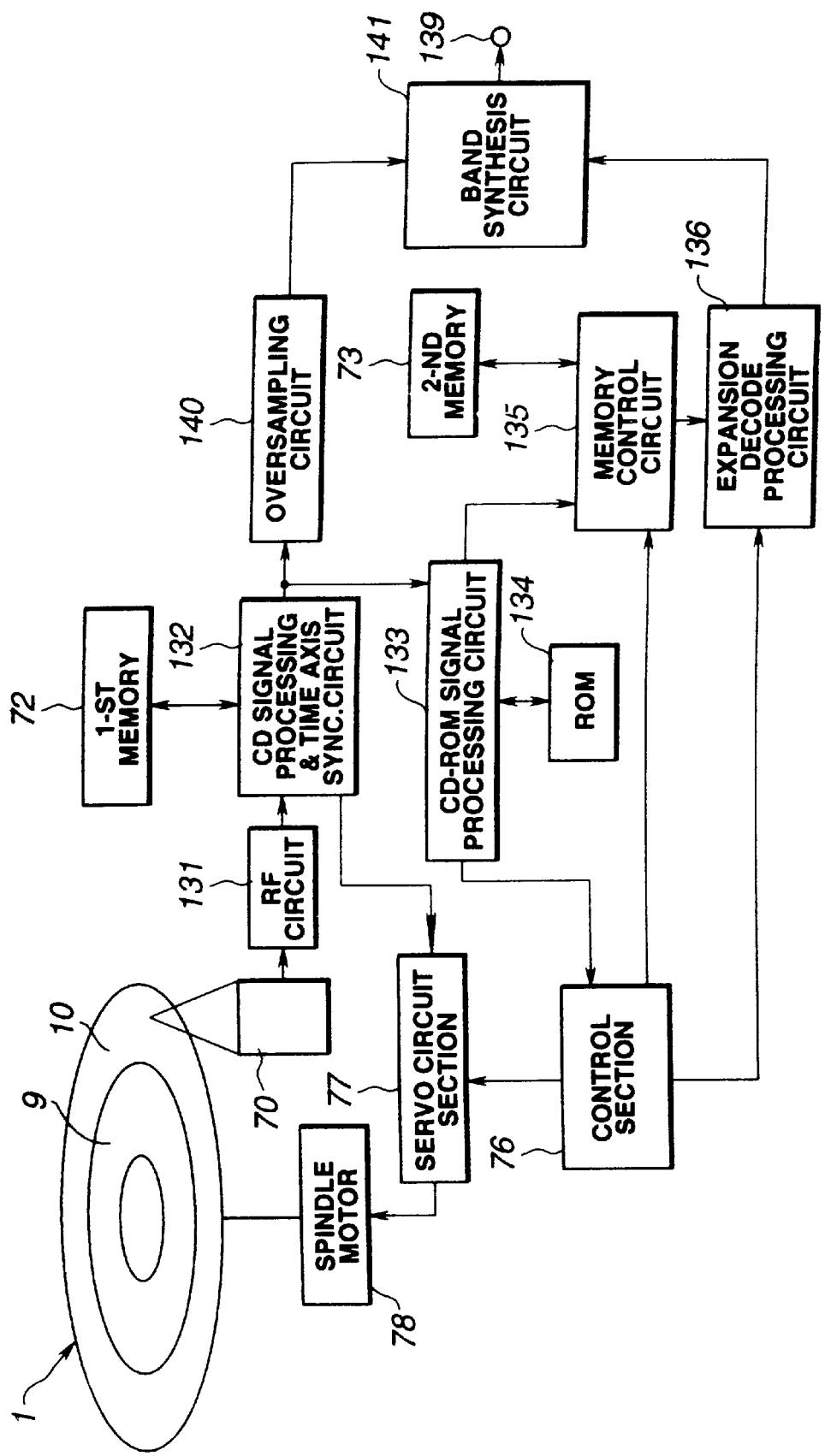
FIG. 18 is a block diagram showing the configuration of a second modified example of the reproducing apparatus.

The configuration of the reproducing apparatus of the second modified example is shown in FIG. 18. It is to be noted that, in the following description, the same reference numerals are respectively attached to the same circuits as those of the reproducing apparatus shown in FIG. 17 and their explanation will be omitted.

An output from the optical pick-up 70 is delivered to CD signal processing and time axis synchronization circuit 132 through RF circuit 131 in a manner as described above. In this example, the access operation of the optical pick-up 70 is controlled by a servo control signal from the servo circuit section 77.

The CD signal processing and time axis synchronization circuit 132 demodulates EFM data from the first recording area 3 to store it into the first memory 72 as reproduction data of the CD-DA format standard. Moreover, the CD signal processing and time axis synchronization circuit 132 demodulates EFM data from the second recording area 6 to deliver it to the CD-ROM signal processing section 133. Further, the CD signal processing and time axis synchronization circuit 132 takes out reproduction data from the first memory 72 on the basis of the memory control signal from the control section 76 to deliver it to an oversampling circuit 140. In this example, the operation of the CD signal processing and time axis synchronization circuit 132 is controlled by processing control signal from the control section 76.

The oversampling circuit 140 will now be described.

As described above, the digital audio information recorded in the first recording area 3 is the portion of 0 kHz~22 kHz of data sampled at 88.2 kHz. On the contrary, the oversampling circuit 140 is supplied with data of the CD-DA format standard, i.e., data sampled at the sampling frequency of 44.1 kHz. Accordingly, the oversampling circuit 140 oversamples the data of the CD-DA format standard, e.g., at the sampling frequency of 88.2. kHz to deliver oversampled data thus obtained to a band synthesis circuit 141.

On the other hand, as described above, the CD-ROM signal processing circuit 133 carries out error correction of data recorded in the second recording area 6 and/or address processing thereof to deliver reproduction data thus obtained to the second memory 73 through the memory control circuit 135, and delivers address information to the control section 76. In this example, the operation of the CD-ROM signal processing circuit 133 is controlled on the basis of the processing control signal from the control section 76.

The memory control circuit 135 allows the second memory 73 to store therein the reproduction data from the CD-ROM signal processing circuit 133, and reads out the reproduction data from the second memory 73 on the basis of memory control signal from the control section 76 to deliver it to the expansion decode processing circuit 136.

Since reproduction data which has been read out from the second memory 73 is compressed by the algorithm of ATRAC, the expansion decode processing circuit 136 decodes that reproduction data to deliver data thus obtained to the band synthesis circuit 141. In this example, the data obtained by decode processing is the portion of 22 kHz~44 kHz of the digital audio information sampled at 88.2 kHz. In addition, the expansion decode processing circuit 136 is controlled on the basis of decode control signal from the control section 76.

The band synthesis circuit 141 synthesizes data of 0 kHz~22 kHz sampled at the sampling frequency of 88.2 kHz delivered from the oversampling circuit 140 and data of 22 kHz~44 kHz sampled at the sampling frequency of 88.2 kHz delivered from the expansion decode processing circuit 136 to output digital audio information within the range of 0 kHz~44 kHz sampled at the sampling frequency of 88.2 kHz through a digital audio information output terminal 139. In this example, since taking-out operation of reproduction data from the first memory 72 and taking-out operation of reproduction data from the second memory 73 are controlled by the control section 76. Since digital audio information corresponding to each other are inputted to the band synthesis circuit 141 in the state where their timings are in correspondence with each other, there is no necessity of particularly taking synchronization therebetween.

Subsequently, a third modified example of the first A embodiment of the reproducing apparatus will be described below.

In this reproducing apparatus, digital audio information recorded in the first recording area 3 of the first session 9 of the CD-R disc 1 is digital audio information of high order, e.g., 16 bits of digital audio information obtained by sampling an audio signal at a predetermined sampling frequency, e.g., 44.1 kHz thereafter to quantize the audio signal thus sampled by a predetermined number of bits, e.g., 20 bits, and digital audio information recorded in the second recording area 6 of the second session 10 is digital audio information of low order 4 bits of the quantized digital audio information. This reproducing apparatus is adapted to reproduce digital audio information from the CD-R disc 1.

Figure 19:
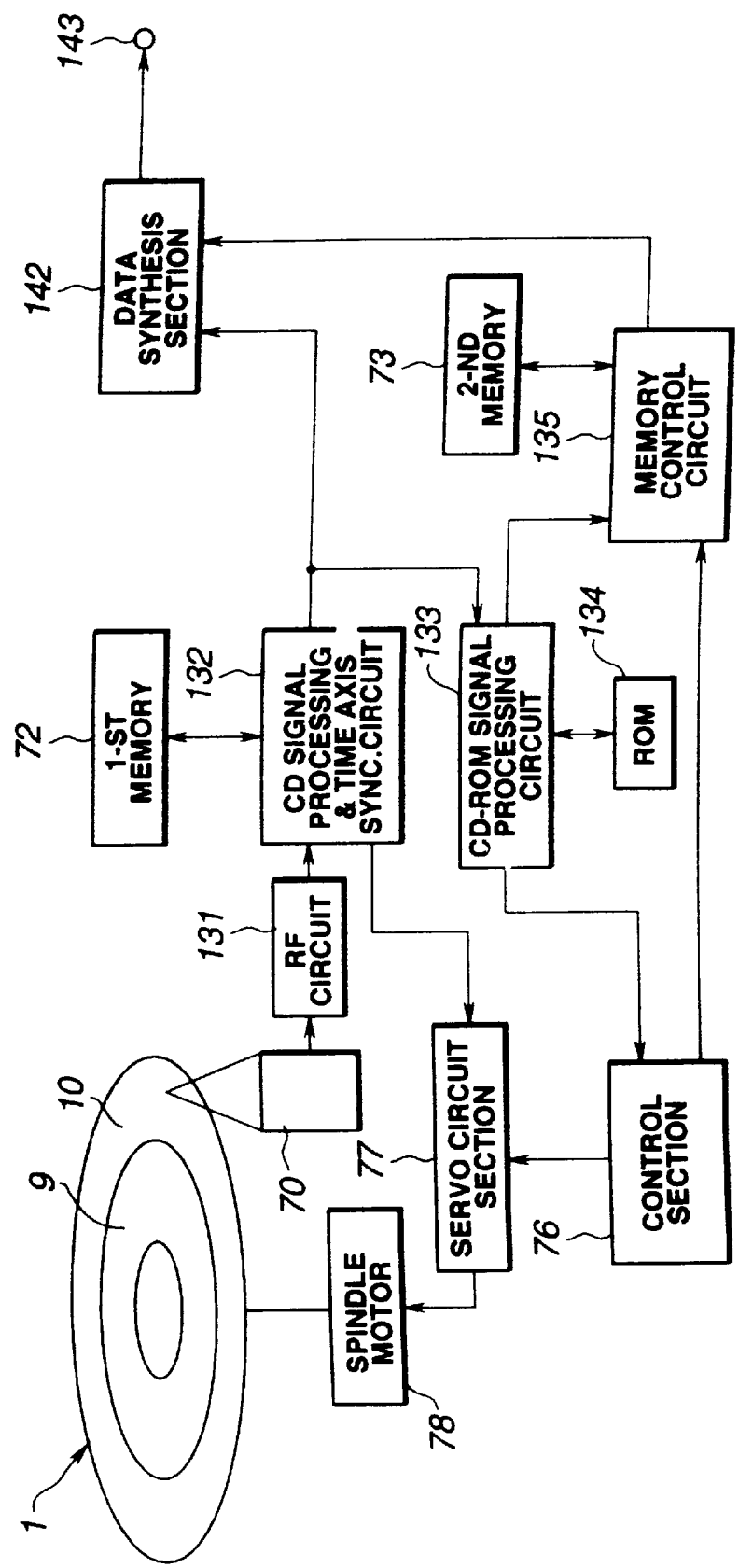
FIG. 19 is a block diagram showing the configuration of a third modified example of the reproducing apparatus.

The configuration of the reproducing apparatus of the third modified example is shown in FIG. 19. It is to be noted that, in the following description, the same reference numerals are respectively attached to the same circuits as those of the reproducing apparatus of FIG. 17 and their explanation will be omitted.

An output from the optical pick-up 70 is delivered to the CD signal processing and time axis synchronization circuit 132 through RF circuit 131. In this example, the access operation of the optical pick-up 70 is controlled by a servo control signal from the servo circuit section 77.

The CD signal processing and time axis synchronization circuit 132 demodulates EFM data from the first recording area 3 to allow the first memory 72 to store it as reproduction data of the CD-DA format standard. Moreover, the CD signal processing and time axis synchronization circuit 132 demodulates EFM data from the second recording area 6 to deliver it to the CD-ROM signal processing section 133. Further, the CD signal processing and time axis synchronization circuit 132 takes out reproduction data from the first memory 72 on the basis of the memory control signal from the control section 76 to send it to a data synthesis section 142. It is to be noted that data obtained in this example is data of high order 16 bits of digital audio information of 20 bits sampled at the sampling frequency of 44.1 kHz, and only this portion can be outputted as reproduction output. In addition, the operation of the CD signal processing and time axis synchronization circuit 132 is controlled by the processing control signal from the control section 76.

As described above, the CD-ROM signal processing circuit 133 carries out error correction of data recorded in the second recording area 6 and/or address processing thereof to deliver reproduction data thus obtained to the second memory through the memory control circuit 135, and delivers the address information to the control section 76. In this case, the operation of the CD-ROM signal processing circuit 133 is controlled on the basis of processing control signal from the control section 76.

The memory control circuit 135 allows the second memory 73 to store therein reproduction data from the CD-ROM signal processing circuit 133, and reads out the reproduction data from the second memory 73 on the basis of the memory control signal from the control section 76 to deliver it to the data synthesis section 142. In this case, data outputted from the memory control circuit 135 is data of low order 4 bits of digital audio information of 20 bits sampled at the sampling frequency of 44.1. kHz.

The data synthesis section 142 synthesizes data of high order 16 bits from the CD signal processing and time axis synchronization circuit 132 and data of low order 4 bits from the memory control circuit 135 to generate digital audio information of 20 bits in which the audio signal is sampled at the sampling frequency 44.1 kHz to output it through a digital audio information output terminal 143. In this example, taking-out operation of reproduction data from the first memory 72 and taking-out operation of reproduction data from the second memory 73 are controlled by the control section 76. Accordingly, digital audio information corresponding to each other are inputted to the data synthesis section 142 in the state where their timings are in correspondence with each other. For this reason, there is no necessity of particularly taking synchronization therebetween.

Meanwhile, in any of the first to third modified examples, when data of the CD-ROM format recorded in the second recording area 6 is taken as digital audio information including time code of data of the corresponding first recording area 3, reproduction data are read out from the first memory 72 and the second memory 73 at the same time (in parallel) to synthesize them by making reference to the time code, thereby making it possible to reproduce high sound quality digital audio information.

A second embodiment of the reproducing apparatus to which this invention is applied will now be described.

The reproducing apparatus of the second embodiment is directed to a reproducing apparatus adapted for reproducing digital audio information from CD-R disc 1 including, as shown in FIGS. 1A–1B, for example, first recording area 3 where digital audio information and address information are recorded in multiplexed manner, first management area 2 where information for carrying out management of the digital audio information recorded in the first recording area 3 is recorded, a second recording area 6 where digital audio information and address information corresponding to the first recording area 3 are recorded in multiplexed manner, and second management area 5 where information for carrying out management of the digital audio information recorded in the second recording area 6 is recorded, the reproducing apparatus comprising, as shown in FIGS. 20A–20C, for example, a first pick-up 151 and a first signal processing section 153 for reading digital audio information and address information from the first recording area 3, a second pick-up 152 A and a second signal processing section 154 for reading digital audio information and address information from the second recording area 6, an internal memory 160 for storing digital audio information from the second signal processing section 154, a control section 155 for controlling the internal memory 160 and the second signal processing section 154 on the basis of the address information from the first recording area 3 and the address information from the second recording area 6, a mixing section 162 for mixing the digital audio information reproduced by the first pick-up 151 and the digital audio information reproduced by the second pick-up 152, and a D/A converting section 164 for converting the digital audio information mixed by the mixing section 162 into an analog audio signal to output it.

As described above, the CD-R disc 1 is an optical disc of multisession such that the first session 9 is recorded by the CD-DA format, and the second session 10 is recorded by the CD-ROM format.

In operation, the first pick-up 151 reads the digital audio information recorded in the first session 9 to deliver a reproduction signal thus obtained to the first signal processing section 153. Moreover, the first pick-up 151 provides access to the CD-R disc 1 on the basis of servo control signal or read stop signal which will be described later from the control section 155.

Further, the second pick-up 152 reads the digital audio information recorded in the second session 10 to deliver a reproduction signal thus obtained to the second signal processing section 154. In addition, the second pick-up 152 provides access to the CD-R disc 1 on the basis of the servo control signal or the read stop signal from the control section 155 similarly to the first pick-up 151.

The first signal processing section 153 binarizes the reproduction signal from the first pick-up 151 to deliver data from the first management area 2 thus obtained to the control section 155, and demodulates data from the first recording area 3 by the system prescribed by the CD-DA format to deliver digital audio information of 16 bits thus obtained to the mixing section 162 through a 16 bit data path 156 to deliver address data of the digital audio information to the internal memory 160 through an address data path 157.

The second signal processing section 154 binarizes the reproduction signal from the second pick-up 152 to extract discrimination data indicating kind (type) of the CD-R disc 1 from the second management area 5 to decode data from the second recording area 6 on the basis of the discrimination data. Moreover, the second signal processing section 154 delivers data of the CD-ROM format thus obtained to the internal memory 160 through a CD-ROM format data path 158 to deliver address data of respective data to the internal memory 160 through an address data path 159.

The internal memory 160 temporarily stores, as storage data, data of the CD-ROM format delivered from the second signal processing section 154, and delivers the storage data to the mixing section 162, while taking timing so as to synchronize the timing when digital audio information of 16 bits obtained at the first signal processing section 153 is outputted to the mixing section 162, on the basis of address data delivered from the first signal processing section 153 and address data sent from the second signal processing section 154.

Moreover, the storage data is delivered also to a detecting section 161. The detecting section 161 estimates storage data quantity of the internal memory 160 to deliver detection data thus obtained to the control section 155.

Figure 21:
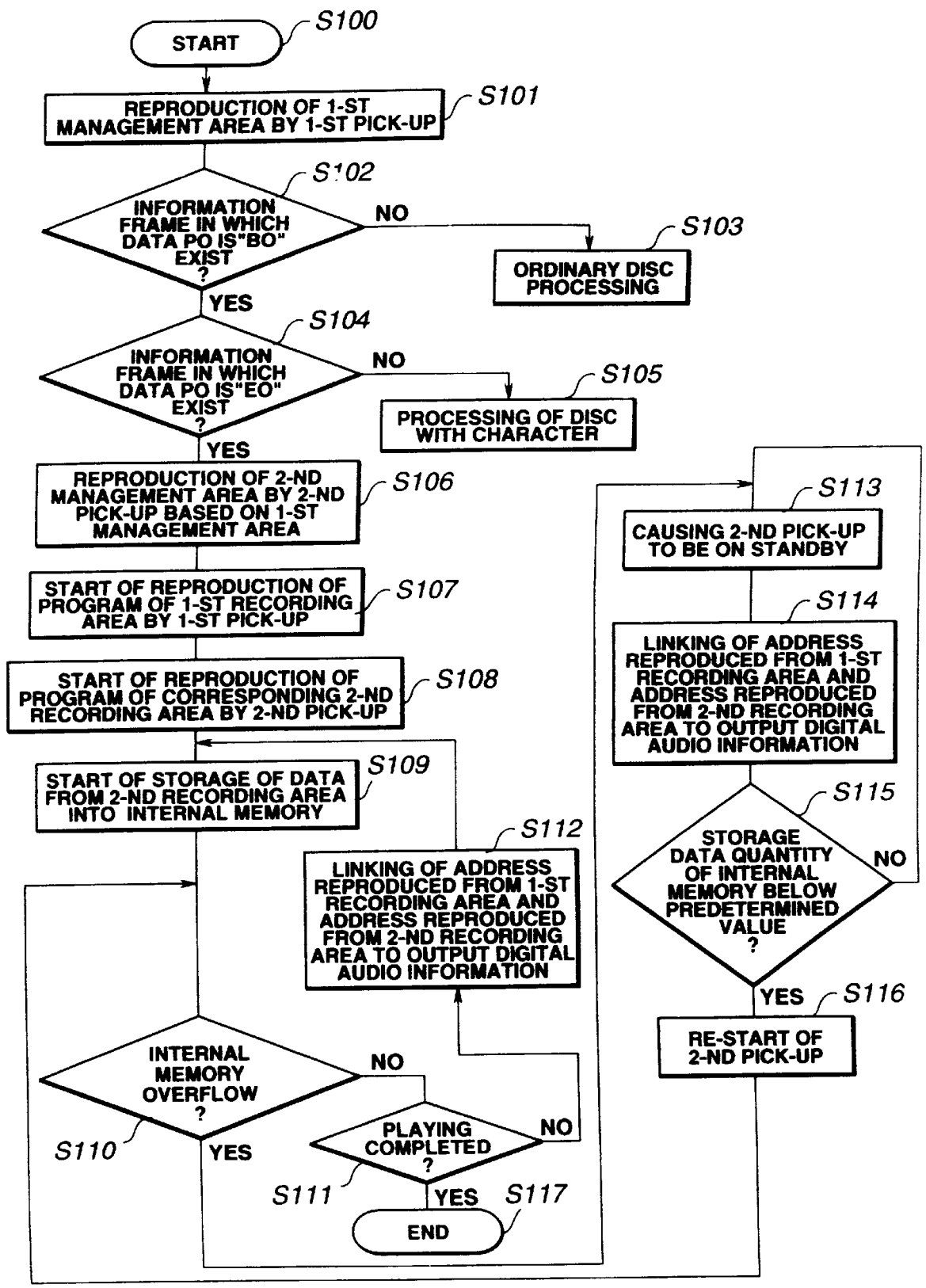
FIG. 21 is a flowchart for explaining a reproducing method to which this invention is applied, i.e., based on the reproducing apparatus of the second embodiment.

The control section 155 delivers control signals to respective circuit components of the reproducing apparatus of the second example (embodiment) on the basis of reproduction signal sent from the first signal processing section 153 and detection data sent from the detecting section 161 to control the operations of respective circuit components in accordance with the flowchart showing the reproducing method by the reproducing apparatus of the second example (embodiment) shown in FIG. 21.

Explanation will be given with reference to the flowchart shown in FIG. 21, for example, in connection with the operation of the reproducing apparatus of the second embodiment, i.e., the reproducing method to which this invention is applied.

The reproducing method to which this invention is applied is a reproducing method for reproducing audio information from CD-R disc 1 which is the recording medium including first recording area 3 where digital audio information and address information are recorded in a multiplexed manner, first management area 2 where information for carrying out management of the digital audio information recorded in the first recording area 3 is recorded, second recording area 6 where digital audio information and address information corresponding to the first recording area 3 are recorded in a multiplexed manner, and second management area 5 where information for carrying out management of the digital audio information recorded in the second recording area 6 is recorded, the reproducing method including, as shown in FIG. 21, step S107 of reading digital audio information and address information from the first recording area 3 by the first pick-up 151, step S108 of reading digital audio information and address information from the second recording area 6 by the second pick-up 152, steps S112, S114 of outputting, on the basis of the digital audio information and the address information obtained at the step S107 and the digital audio information and the address information obtained at the step S108, the digital audio information while taking synchronization therebetween, step S110 of discriminating whether or not information storage quantity of the internal memory 160 for temporarily storing digital audio information from the second pick-up 152 is a predetermined value or more, step S113 such that in the case where it is discriminated at the step S110 that storage quantity of information stored in the memory section is the predetermined value or more, such a control is conducted to allow the second pick-up 152 to be in the standby state, step S115 of discriminating whether or not information storage quantity of the internal memory 160 is below the predetermined value, and step S116 such that in the case where it is below the predetermined value, such a control is conducted to re-start the second pick-up 152.

In this reproducing method, at step S100, the reproducing operation of the CD-R disc 1 is started. At step S101, the control section 155 delivers a servo control signal to the first pick-up 151 so as allow it to provide access to the first management area 2 to allow the first pick-up 151 to carry out reproduction of management information from the first management area 2. Then, the processing proceeds to step S102.

At step S102, whether or not information frame in which data PO shown in FIG. 5 is "B0" exists in management information delivered from the first pick-up 151 (hereinafter referred to as first management information) is discriminated at the control section 155. Namely, whether or not the disc being reproduced is multisession disc is discriminated. In the case where discrimination result is NO, i.e., the disc being reproduced is single session disc, the processing proceeds to step S103. This reproducing apparatus carries out reproduction processing of the ordinary disc.

On the other hand, in the case where discrimination result at the step S102 is YES, i.e., it is discriminated that the disc being reproduced is multisession disc, the processing proceeds to step S104. Whether or not information frame in which data PO is "E0" exists in the first management information is discriminated in turn. When this discrimination result is NO, i.e., it is discriminated that the disc being reproduced is the disc where only character data is recorded in the second management area 5 of the second session 10 and no data is recorded in the second recording area 6, the processing proceeds, to step S105. Thus, the reproducing apparatus carries out reproduction processing of the so-called disc with character.

On the other hand, in the case where the discrimination result at the step S104 is YES, i.e., it is discriminated that the disc being reproduced is the CD-R disc, the processing proceeds to step S106. Thus, the control section 155 delivers a servo control signal to the second pick-up 152 so as to allow it to provide access to the second management area 5 on the basis of address information indicated by the first management information. Thus, the second pick-up 152 carries out reproduction of the second management area 5. Then, the processing proceeds to step S107.

At the step S107, the control section 155 delivers a servo control signal to the first pick-up 151 so as to allow it to provide access to the first recording area 3 on the basis of address information indicated by the first management information. Thus, the first pick-up 151 reproduces program recorded in the first recording area 3.

Moreover, at step S108, the control section 155 delivers a servo control signal to the second pick-up 152 so as to allow it to provide access to the second recording area 6 on the basis of address information indicated by the second management information. Thus, the second pick-up 152 reproduces program recorded in the second recording area 6.

At step S109, the control section 155 delivers memory control signal to the internal memory 160. Thus, the internal memory 160 stores data obtained by reproducing the second recording area 6.

Moreover, at step S110, the control section 155 discriminates on the basis of detection data delivered from the detection section 161 whether or not quantity of storage data of the internal memory 160 reaches a predetermined quantity, e.g., storage allowed quantity. In the case where this discrimination result is NO, i.e., sufficient empty area exists in the internal memory 160, the processing proceeds to step S111.

At the step S111, whether or not reproduction of the second recording area 6 is completed is discriminated. In the case Is where this discrimination result is NO, i.e., playing has not yet been completed, the processing proceeds to step S112. Thus, the control section 155 delivers, to the internal memory 160, such a memory control signal to output storage data in a manner to allow address information obtained by reproducing the first recording area 3 and address information obtained by reproducing the second recording area 6 to be synchronous with each other while continuing the reproduction operation of the second pick-up 152. Then, the processing returns to the step S109.

On the other hand, in the case where the discrimination result at the step S111 is YES, i.e., playing has been completed, the processing proceeds to step S117. Thus, the control section 155 sends the read stop signal to the first pick-up 151 and the second pick-up 152 to stop the reproduction operation. Then, this reproducing apparatus completes the reproducing operation.

Moreover, in the case where the discrimination result at the step S110 is YES, i.e., it is discriminated that quantity of storage data of the internal memory 160 reaches the storage allowed quantity so that it is impossible to still more take thereinto data beyond that quantity, the processing proceeds to step S113. Thus, the control section 155 sends the read stop signal to the second pick-up 152. The second pick-up 152 stops the reproduction operation and is caused to be on standby.

At step S114, the control section 155 delivers, to the internal memory 160, similarly to the step S112, such a memory control signal to output storage data in the state where address A information obtained by reproducing the first recording area 3 and address information obtained by reproducing the second recording area 6 are synchronized with each other. Then, the processing proceeds to step S115.

At the step S115, the control section 155 discriminates on the basis of the detection data from the detection section 161 whether or not quantity of the storage data is less than the predetermined value. In the case where this discrimination result is NO, i.e., it is discriminated that space area is not sufficiently ensured in the internal memory 160, the processing returns to the step S113.

On the other hand, in the case where the discrimination result at the step S115 is YES, i.e., it is discriminated that quantity of storage data reaches the predetermined value so that sufficient space area is ensured in the internal memory 160, the processing proceeds to step S116. Thus, the control section 155 sends, to the second pick-up 152 caused to be in standby state, such a control signal that it is re-started. Then, the processing returns to the step S110.

It is to be noted that the operation from the step S109 to the step S116 is continued after playing has been completed.

In the case where the CD-R disc 1 is an optical disc of the multisession such that digital audio information recorded in the first recording area 3 is digital audio information of 2 channels and digital audio information recorded in the second recording area 6 is digital audio information of 2 channels corresponding to the digital audio information recorded in the first recording area 3, i.e., in the case where data of the forward channels are recorded in the first session 9 of the CD-R disc 1 by the CD-DA format and data of the backward channels are recorded in the second session 10 by the CD-ROM format in the compressed state, two information frames in which data PO of the management information shown in FIG. 5 is "B0", "E0" exist in the first management area 2, and information frame in which data PO of the management information shown in FIG. 5 is "D1" exists in the second management area 5. These information frames serve as discrimination data for discriminating the optical disc of multichannels.

Thus, the control section 155 detects, at the step S102 and, the step S104 of the flowchart indicating the reproducing method of FIG. 21, information frame in which data PO is "B0" and information frame in which data PO is "E0" in the first management information from the first pick-up 151, and detects, at the step S106, information frame in which data PO is "D1" in the second management information from the second pick-up 152. Then, the control section 155 delivers, to the second signal processing section 154, a processing control signal for designating a signal processing method to carry out signal processing for reproducing the second recording area 6 of this optical disc corresponding to the multichannel, e.g., to carry out expansion processing in reproducing compressed data.

Accordingly, the first signal processing section 153 outputs digital audio information of 16 bits of the forward channels, and the second signal processing section 154 outputs data of the backward channels. Thus, high sound quality digital audio information of 4 channels are outputted from a digital audio information output terminal 165.

Further, in the case where the CD-R disc 1 is an optical disc adapted to cope with signals of which number of bits has been increased, such that digital audio information recorded in the first recording area 3 is digital audio information of high order bits of digital audio information quantized by a predetermined number of bits after undergone sampling at a predetermined sampling frequency, and digital audio information recorded in the second recording area 6 is digital audio information of low order bits of the quantized digital audio information, i.e., in the case where, e.g., digital audio information of high order 16 bits is recorded in the first session 9 of the CD-R disc 1 by the CD-DA format, and digital audio information of low order 4 bits is recorded in the second session 10 by the CD-ROM format in the state compressed in accordance with, e.g., the above-described algorithm of ATRAC, i.e., digital audio information of which number of bits has been increased of 20 bits is recorded, two information frames in which data PO of the management information shown in FIG. 5 is "B0", "E0" exist in the first management area 2, and information frame in which data PO of the management information shown in FIG. 5 is "D2" exists in the second management area 5. These information frames serve as discrimination data for the optical disc adapted to cope with signals of which number of bits has been increased.

Thus, the control section 155 detects, at the step S102 and the step S104 of the flowchart showing the reproducing method of FIG. 21, information frame in which data PO is "B0" and information frame in which data PO is "E0" in the first management information from the first pick-up 151, and detects, at the step S106, information frame in which data PO is "D2" in the second management frame from the second pick-up 152. Then, the control section 155 delivers, to the second signal processing section 154, a processing control signal for designating a signal processing method to carry out signal processing for reproducing the second recording area 6 of the optical disc 2 adapted to copes with signals of which number of bits has been increased, e.g., to carry out expansion processing in reproducing compressed data.

Accordingly, the first signal processing section 153 outputs data recorded by the CD-DA format, and the second signal processing section 154 outputs data obtained as the result of the fact that information of low order 4 bits has been caused to undergo expansion processing. Thus, high sound quality digital audio information of 20 bits is outputted from the digital audio information output terminal 165.

Moreover, in the case where the CD-R disc 1 is an optical disc such that digital audio information recorded in the first recording area 3 is digital audio information obtained by band-dividing, at a predetermined frequency, e.g., 22 kHz which is one fourth (¼) of sampling frequency, digital audio information sampled at a predetermined sampling frequency, e.g., 88.2 kHz and quantized by a predetermined number of bits, e.g., 20 bits so that grouping into the digital audio information of the higher frequency band side and the digital audio information of the lower frequency band side is carried out to sample, e.g., the digital audio information of the lower frequency side at a sampling frequency lower than the sampling frequency of 88.2 kHz, e.g., 44.1 kHz i.e., to carry out down-sampling, and digital audio information recorded in the second recording area 6 is digital audio information adapted to cope with the so-called high-sampling data (data sampled at high sampling frequency), obtained by compressing the digital audio information of the higher frequency side, e.g., by the above-described algorithm of ATRAC, i.e., in the case where, e.g., data of the lower frequency band side (0 kHz~22 kHz) of signal sampled at the sampling frequency of 88.2 kHz is recorded in the first session 9 of the CD-R disc 1 after undergone down-sampling, and data of the higher frequency band side (22 kHz~44 kHz) is recorded in the second session 10 by the CD-ROM format in the compressed state, two information frames in which data PO of the management information shown in FIG. 5 is "B0", "E0" exist in the first management area 2, and information frame in which data PO of the management information shown in FIG. 5 is "D3" exists in the second management area 5. These discrimination frames serve as discrimination data for the optical disc corresponding to multichannel.

Thus, the control section 155 detects, at the step S102 and the step S104 of the flowchart showing the reproducing method of FIG. 21, information frame in which data PO is "B0" and information frame in which data PO is "E0" in the first management information from the first pick-up 151, and detects, at the step S106, information frame in which data PO is "D3" in the second management information from the second pick-up 152. Then, the control section 155 delivers, to the second signal processing section 154, a processing control signal which designates a signal processing method to carry out signal processing for reproducing the second recording area 6 of the optical disc adapted to cope with increased number of bits, e.g., to carry out expansion processing in reproducing compressed data, Accordingly, the first signal processing section 153 outputs data recorded by the CD-DA format, and the second signal processing section 154 expands compressed digital audio information to output it. Thus, high sound quality digital audio information of 20 bits sampled at the sampling frequency of 88.1 kHz is outputted from the digital audio information output terminal 165.

It is to be noted that while the example of the CD-R disc including plural sessions on the same surface was taken as the recording medium of this invention, and the examples of the recording apparatus for recording data on such a CD-R disc, and the reproducing method and the reproducing apparatus for reproducing such CD-R disc were taken, this invention is not limited to such implementation. For example, this invention can be applied to, e.g., a multimedia optical disc as a recording medium including multilayer structure, e.g., a multimedia optical disc such that data of the CD-DA format is recorded at the first layer and data of the CD-ROM format is recorded at the second layer, and a recording apparatus, a reproducing method and a reproducing apparatus for such multimedia optical disc.

INDUSTRIAL APPLICABILITY

As described above, in accordance with the recording medium of this invention, data can be recorded by different formats with respect to the first session 9 and the second session 10, respectively. Further, digital audio information to be recorded by the CD-DA format is recorded into the first session 9, and digital audio information attached to the digital audio information recorded in the first session 9 is recorded into second session 10, thereby making it possible to prepare a recording medium adapted so that audio data can be recorded in the state of high sound quality and compatibility with the conventional CD player is maintained.

Moreover, the recording medium is caused to be a recording medium such that digital audio information of 4 channels are recorded by 2 channels in respective sessions in such a manner that digital audio information is recorded at least in the first session by the CD-DA format, thereby making it possible to prepare a recording medium adapted so that audio data can be recorded in the state of high sound quality and maintain compatibility with the conventional CD player is maintained.

Further, the recording medium is caused to be a recording medium such that the portion up to 16 bits of digital audio information more than 16 bits is recorded into the first session 9 by the CD-DA format, and digital audio information of the remaining bits is recorded into the second session 10, e.g., by the CD-ROM format. Thus, a recording medium adapted so that audio data can be recorded in the state of high sound quality and compatibility with the conventional CD player is maintained can be prepared.

Further, the recording medium is caused to be a recording medium such that digital audio information sampled by the sampling frequency prescribed (specified) by the ordinary CD-DA format is band-divided at a predetermined frequency, e.g., a frequency which is one half (½) of the sampling frequency so that grouping into digital audio information of the higher frequency band side and digital audio information of the lower frequency band side of the frequency is made to down-sample the digital audio information of the lower frequency band side to record it into the first session 9 by the CD-DA format, and to record the digital audio information of the higher frequency band side into the second session 10, e.g., by the CD-ROM format. Thus, the recording medium adapted so that audio data can be recorded in the state of high sound quality and compatibility with the conventional CD player is maintained can be prepared.

Further, in accordance with the recording apparatus of this invention, data can be respectively recorded by different formats with respect to the first session 9 and the second session 10. Further, digital audio information to be recorded by the CD-DA format is recorded into the first session 9, and digital audio information attached to the digital audio information recorded in the first session 9 is recorded into the second session. Thus, the recording medium adapted so that audio data can be recorded in the state of high sound quality and maintain compatibility with the conventional CD player is maintained can be prepared.

Further, in accordance with the reproducing method of this invention, reproduction of a recording medium such that digital audio information is recorded in the first recording area 3 and digital audio information corresponding to the digital audio information recorded in the first recording area 3 is recorded in the second recording area 6 is carried out by reading and reproducing respective digital audio information corresponding to each other recorded in the first and second recording areas 3 and 6 to synchronously output them. Thus, reproduction of digital audio information can be carried out without damaging sound quality from the recording medium on which digital audio information is recorded in the state of high sound quality.

Further, in the reproduction method, in the case where there is used a recording medium such that digital audio information of 2 channels are recorded in the first recording area 3 and digital audio information of 2 channels corresponding to the digital audio information recorded in the first recording area 3 are recorded in the second recording area 6, the digital audio information recorded in the first recording area 3 and the digital audio information recorded in the second recording area 6 are respectively read and reproduced, and are outputted in a manner synchronized with each other. Thus, reproduction of information of high sound quality digital audio information of multichannel can be carried out.

Further, in the reproducing method, in the case where there is used a recording medium such that the portion up to 16 bits of digital audio information more than 16 bits is recorded in the first recording area 3, and digital audio information of the remaining bits is recorded in the second recording area 6, the digital audio information recorded in the first recording area 3 and the digital audio information recorded in the second recording area 6 are respectively read and reproduced to output them in a manner synchronized with each other. Thus, reproduction of high sound quality digital audio information of which number of bits has been increased can be carried out.

Further, in the reproducing method, in the case where there is used a recording medium such that information obtained by band-divide, at a predetermined frequency, e.g., frequency which is one half (½) of sampling frequency, digital audio information sampled at the sampling frequency prescribed (specified) by the ordinary CD-DA format to down-sample the digital audio information of the lower frequency band side with respect to the frequency which is one half (½) of the sampling frequency is recorded in the first recording area 3, and information obtained by compressing the digital audio information of the higher frequency band side is recorded in the second recording area 6, an approach is employed to reproduce the digital audio information from the first recording area 3, and to reproduce compressed information from the second recording area 6 after undergone expansion processing to output digital audio information corresponding to each other in a manner synchronized with each other. Thus, reproduction of high sound quality digital audio information of the so-called high-sampling system (sampled at high sampling frequency) can be carried out.

Further, in accordance with the reproducing apparatus of this invention, reproduction of a recording medium such that digital audio information is recorded in the first recording area 3 and digital audio information corresponding to the digital information recorded in the first recording area 3 is recorded in the second recording area 6 is carried out, by using single reproducing means, by reading and reproducing the digital audio information recorded in the first and second recording area 3, 6 to output respective digital audio information corresponding to each other in a manner synchronized with each other. Thus, it becomes possible to carry out reproduction of digital audio information without damaging sound quality from the recording medium on which digital audio information is recorded in the state of high sound quality.

Further, in the reproducing apparatus, in the case where there is used a recording medium such that digital audio information of 2 channels are recorded in the first recording area 3 and digital audio information of 2 channels corresponding to the digital audio information recorded in the first recording area 3 is recorded in the second recording area 6, the digital audio information recorded in the first recording area 3 and the digital audio information recorded in the second recording area 6 are read and reproduced by reproducing means to allow the control means to conduct a control so as to output digital audio information corresponding to each other in a manner synchronized with each other. Thus, reproduction of high sound quality digital audio information of multichannel can be carried out.

Further, in the reproducing apparatus, in the case where there is used a recording medium such that the portion up to 16 bits of digital audio information more than 16 bits is recorded in the first recording area 3, and digital audio information of the remaining bits is recorded in the second recording area 6, the digital audio information recorded in the first recording area 3 and digital audio information recorded in the second recording area 6 are read and reproduced by reproducing means to allow the control means to conduct a control to output digital audio information corresponding to each other in a manner synchronized with each other. Thus, reproduction of high sound quality digital audio information of which number of bits has been increased can be carried out.

Further, in the reproducing apparatus, in the case where there is used a recording medium such that information obtained by band-dividing, at a predetermined frequency, e.g., a frequency which is one half (½) of sampling frequency, digital audio information sampled at the sampling frequency prescribed (specified) by the ordinary CD-DA format to down-sample the digital audio information of the lower frequency band side with respect to the frequency which is one half (½) of the sampling frequency is recorded in the first recording area 3, and information obtained by compressing the digital audio information of the higher frequency band side is recorded in the second recording area 6, reproducing means is caused to read and reproduce the digital audio information recorded in the first recording area 3, and to read compressed digital audio information from the second recording area 6 to expand the digital audio information thus read to reproduce it, and control means is caused to conduct a control so as to output digital audio information corresponding to each other in a manner synchronized with each other. Thus, reproduction of high sound quality digital audio information of the so called high-sampling (sampled at high sampling frequency) can be carried out.

Further, in accordance with the reproducing apparatus of this invention, reproduction of a recording medium such that digital audio information is recorded in the first recording area, and digital audio information corresponding to the digital audio information recorded in the first recording area 3 is recorded in the second recording area 6 is carried out by using two reproducing means, by taking out the digital audio information recorded in the first and second recording areas 3, 6 to output respective digital audio information corresponding to each other by mixing means in a manner synchronized with each other. Thus, it becomes possible to carry out reproduction of digital audio information without damaging the sound quality from the recording medium on which digital audio information is recorded in the state of high sound quality.

Further, in the reproducing apparatus, in the case where there is used a recording medium such that digital audio information of 2 channels are recorded in the first recording area 3 and digital audio information of 2 channels corresponding to the digital audio information recorded in the first recording area 3 are recorded in the second recording area 6, first reproducing means is caused to read and reproduce the digital audio information recorded in the first recording area 3, second reproducing means is caused to read and reproduce the digital audio information recorded in the second recording area 6, and mixing means is caused to output digital audio information corresponding to each other from the first and second reproducing means in a manner synchronized with each other. Thus, reproduction of high sound quality digital audio information of multichannel can be carried out.

Further, in the reproducing apparatus, in the case where there is used a recording medium such that the portion up to 16 bits of digital audio information more than 16 bits is recorded in the first recording area 3, and digital audio information of the remaining bits is recorded in the second recording area 6, digital audio information recorded in the first recording area 3 is read and reproduced by first reproducing means, digital audio information recorded in the second recording area 6 is read and reproduced by second reproducing means, and digital audio information corresponding to each other are outputted in a manner synchronized with each other by mixing means. Thus, reproduction of high sound quality digital audio information of which number of bits has been increased can be carried out.

In addition, in the reproducing apparatus, in the case where there is used a recording medium such that information obtained by band-dividing, at a predetermined frequency, e.g., frequency which is one half (½) of sampling frequency, digital audio information sampled at the sampling frequency prescribed (specified) by the ordinary CD-DA format to down-sample the digital audio information of the lower frequency band side with respect to the frequency which is one half (½) of the sampling frequency is recorded in the first recording area 3, and information obtained by compressing the digital audio information of the higher frequency band side is recorded in the second recording area 6, the digital audio information recorded in the first recording area 3 is recorded and reproduced by first reproducing means, the compressed digital audio information is read from the second recording area by second reproducing means to expand the digital audio information thus read to reproduce it, and digital audio information corresponding to each other from the first and second reproducing means are outputted in a manner synchronized with each other by mixing means. Thus, reproduction of high sound quality digital audio information of the so-called high-sampling system (sampled at high sampling frequency) can be carried out.

We claim:

1. A reproducing method for reproducing digital audio information from a recording medium including a first recording area where digital information is recorded, a first management area where information for carrying out management of the digital audio information recorded in the first recording area is recorded, a second recording area where digital audio information corresponding to the digital audio information recorded in the first recording area is recorded, and a second management area where information for carrying out the digital audio information recorded in the second recording area is recorded, the method including:
   a first step of reading the information of the first management area by a reproduction head to discriminate on the basis of the management information which has been read whether or not the second recording area exists;
   a second step of moving the reproduction head to the second management area in the case where it is discriminated at the first step that the second recording area exists;
   a third step of reading the information of the second management area by the reproduction head moved at the second step to read the digital audio information of the second recording area on the basis of the information which has been read to store the digital audio information which has been read into a first memory;
   a fourth step of moving the reproduction head to a data recording position within the first recording area where digital audio information corresponding to the digital audio information from the second recording area stored in the first memory at the third step is recorded; and
   a fifth step of reading the digital audio information of the first recording area by the reproduction head moved at the fourth step to store the digital audio information thus read into a second memory, and to output the digital audio information stored in the first memory and the digital audio information stored in the second memory while taking synchronization therebetween.

2. A reproducing method as set forth in claim 1, wherein a speed for writing digital audio information into the first memory is higher than a speed for reading out digital audio information from the first memory, and wherein a speed for writing digital audio information into the second memory is higher than a speed for reading out digital audio information from the second memory.

3. A reproducing method as set forth in claim 1, wherein the reproducing method includes:
   a sixth step of comparing a storage quantity of the second memory and a predetermined value;
   a seventh step such that when it is discriminated at the sixth step that the storage quantity of the first memory is above the predetermined value, a procedure is taken to move the reproduction head to a data recording position within the second recording area where digital audio information successive to the digital audio information stored in the first memory is recorded, and to read the digital audio information; and
   an eighth step of storing the digital audio information of the second recording area which has been read at the seventh step into the first memory, and outputting the digital audio information stored in the first memory and the digital audio information stored in the second memory while taking synchronization therebetween.

4. A reproducing method as set forth in claim 1, wherein the digital audio information recorded in the first recording area is digital audio information of 2 channels, and wherein digital audio information recorded in the second recording area is digital audio information of 2 channels corresponding to the digital audio information recorded in the first recording area.

5. A reproducing method as-set forth in claim 1, wherein the digital audio information recorded in the first recording area is digital audio information of high order bits of digital audio information quantized by a predetermined number of bits after undergoing sampling at a predetermined sampling frequency, and wherein the digital audio information recorded in the second recording area is digital audio information of low order bits of the quantized digital audio information.

6. A reproducing method as set forth in claim 1, wherein the digital audio information recorded in the first recording area is digital audio information obtained by band-dividing, at a predetermined frequency, digital audio information quantized by a predetermined number of bits after undergoing sampling at a predetermined sampling frequency so that grouping into digital audio information of the higher frequency side and the lower frequency side is carried out to sample the digital audio information of one group at a sampling frequency lower than the predetermined sampling frequency, and wherein the digital audio information recorded in the second recording area is digital audio information obtained by compressing the digital audio information of the other group.

7. A reproducing method as set forth in claim 1, wherein the digital audio information recorded in the second recording area includes time code corresponding to the digital audio information of the first recording area.

8. A reproducing apparatus for reproducing digital audio information from a recording medium including a first recording area where digital audio information is recorded, a first management area where information for carrying out management of the digital audio information recorded in the first recording area is recorded, a second recording area where digital audio information corresponding to the digital audio information recorded in the first recording area is recorded, and a second management area where information for carrying out management of the digital audio information recorded in the second recording area is recorded, the apparatus comprising:

reproducing means for reproducing the digital audio information from the recording medium;

first memory means for storing the digital audio information which has been read from the first recording area by the reproducing means;

second memory means for storing the digital audio information which has been read from the second recording area by the reproducing means;

first discrimination means for discriminating whether or not a first quantity of data stored in the first memory means is a predetermined quantity or more;

second discrimination means for discriminating whether or not a second quantity of data stored in the second memory means is a predetermined quantity or more, moving means for moving the reproducing means, and control means for conducting a control to move the reproducing means to the second recording area on the basis of the information of the first management area to store the digital audio information which has been read from the second recording area into the second memory means, whereby in the case where it is discriminated at the second discrimination means that the second quantity of data stored in the second memory means is the predetermined quantity or more, the control means is operative to move the reproducing means to the first recording area where digital audio information corresponding to the digital audio information stored in the second memory means is recorded to store the digital audio information which has been read from the first recording area into the first memory means to output the digital audio information from the first and second memory means while taking synchronization therebetween.

9. A reproducing apparatus as set forth inn claim 8, wherein the digital audio information recorded in the first recording area is digital audio information of 2 channels, and wherein the digital audio information recorded in the second recording area is digital audio information of 2 channels corresponding to the digital audio information recorded in the first recording area.

10. A reproducing apparatus as set forth in claim 8, wherein the digital audio information of the second recording area is compressed digital audio information.

11. A reproducing apparatus as set forth in claim 8, wherein the digital audio information recorded in the first recording area is digital audio information of high order bits of digital audio information quantized by a predetermined number of bits after undergoing sampling at a predetermined sampling frequency, and wherein the digital audio information recorded in the second recording area is digital audio information of low order bits of the quantized digital audio information.

12. A reproducing apparatus as set forth in claim 8, wherein the digital audio information recorded in the first recording area is digital audio information obtained by band-dividing, at a predetermined frequency, digital audio information quantized by a predetermined number of bits after undergoing undergone sampling at a predetermined sampling frequency so that grouping into digital audio information of the higher frequency band side and the lower frequency band side is carried out to sample the digital audio information of one group at a sampling frequency lower than the predetermined sampling frequency; and wherein the digital audio information recorded in the second recording area is digital audio information obtained by compressing the digital audio information of the other group recording area is compressed digital audio information.

13. A reproducing apparatus as set forth in claim 8, wherein the digital audio information recorded in the second recording area includes time code corresponding to the digital audio information recorded in the first recording area.

* * * * *

UNITED STATES PATENT AND TRADEMARK OFFICE
CERTIFICATE OF CORRECTION

PATENT NO.: 5,926,448
DATED: July 20, 1999
INVENTOR(S): TEPPEI YOKOTA ET AL.

It is certified that an error appears in the above-identified patent and that said Letters Patent is hereby corrected as shown below:

In Col. 54, lines 54 & 55, please delete "recording area is compressed digital audio information".

Signed and Sealed this

Thirtieth Day of November, 1999

Attest:

Q. TODD DICKINSON

Attesting Officer

Acting Commissioner of Patents and Trademarks